US011893717B2

(12) United States Patent
Tensmeyer et al.

(10) Patent No.: US 11,893,717 B2
(45) Date of Patent: Feb. 6, 2024

(54) INITIALIZING A LEARNED LATENT VECTOR FOR NEURAL-NETWORK PROJECTIONS OF DIVERSE IMAGES

(71) Applicant: Adobe Inc., San Jose, CA (US)

(72) Inventors: Christopher Tensmeyer, Columbia, MD (US); Vlad Morariu, Potomac, MD (US); Michael Brodie, Highland, UT (US)

(73) Assignee: Adobe Inc., San Jose, CA (US)

( * ) Notice: Subject to any disclaimer, the term of this patent is extended or adjusted under 35 U.S.C. 154(b) by 338 days.

(21) Appl. No.: 17/187,080

(22) Filed: Feb. 26, 2021

(65) Prior Publication Data

US 2022/0277431 A1 Sep. 1, 2022

(51) Int. Cl.
*G06T 5/50* (2006.01)
*G06N 3/08* (2023.01)
(Continued)

(52) U.S. Cl.
CPC .............. *G06T 5/50* (2013.01); *G06F 18/214* (2023.01); *G06N 3/04* (2013.01); *G06N 3/08* (2013.01);
(Continued)

(58) Field of Classification Search
CPC ............. G06T 5/50; G06T 2207/20081; G06T 2207/20084; G06T 5/002; G06F 18/214;
(Continued)

(56) References Cited

U.S. PATENT DOCUMENTS 10,769,848 B1 * 9/2020 Wang ...................... G06T 17/20
11,055,880 B2 * 7/2021 Vishnu Vardhan ..... G06T 11/00
(Continued)

OTHER PUBLICATIONS

Zhu, J-Y., et al., "Generative Visual Manipulation on the Natural Image Manifold", arXiv:1609.03552v3 [cs.CV] Dec. 16, 2018.*
(Continued)

*Primary Examiner* — Xuemei G Chen
(74) *Attorney, Agent, or Firm* — Keller Preece PLLC

(57) ABSTRACT

This disclosure describes one or more embodiments of systems, non-transitory computer-readable media, and methods that can learn or identify a learned-initialization-latent vector for an initialization digital image and reconstruct a target digital image using an image-generating-neural network based on a modified version of the learned-initialization-latent vector. For example, the disclosed systems learn a learned-initialization-latent vector from an initialization image utilizing a high number (e.g., thousands) of learning iterations on an image-generating-neural network (e.g., a GAN). Then, the disclosed systems can modify the learned-initialization-latent vector (of the initialization image) to generate modified or reconstructed versions of target images using the image-generating-neural network. For instance, the disclosed systems utilize the learned-initialization-latent vector as a starting point to learn a learned-latent vector for a target image that an image-generating-neural network converts into a high-fidelity reconstruction of the target image (with a reduced number of learning iterations).

20 Claims, 13 Drawing Sheets

(51) Int. Cl.
 *G06N 3/04* (2023.01)
 *G06F 18/214* (2023.01)
(52) U.S. Cl.
 CPC .............. *G06T 2207/20081* (2013.01); *G06T 2207/20084* (2013.01)
(58) Field of Classification Search
 CPC ............ G06N 3/04; G06N 3/08; G06N 3/045; G06N 3/047; G06N 3/088; G06V 10/778; G06V 10/454
 See application file for complete search history.

(56) References Cited

U.S. PATENT DOCUMENTS

| | | | | |
|---|---|---|---|---|
| 11,580,673 | B1* | 2/2023 | Ren | G06N 3/045 |
| 11,610,122 | B2* | 3/2023 | Karras | H04N 19/20 |
| 2019/0251612 | A1* | 8/2019 | Fang | G06Q 30/0631 |
| 2019/0378263 | A1* | 12/2019 | Lai | G06V 10/7753 |
| 2020/0151559 | A1* | 5/2020 | Karras | G06N 3/045 |
| 2020/0202622 | A1* | 6/2020 | Gallo | G06T 15/10 |
| 2020/0293497 | A1* | 9/2020 | Wu | G06N 3/045 |
| 2020/0372308 | A1* | 11/2020 | Anirudh | G06N 3/088 |
| 2021/0004719 | A1* | 1/2021 | Dupont De Dinechin | G06N 20/00 |
| 2021/0150357 | A1* | 5/2021 | Karras | G06N 3/047 |
| 2021/0209464 | A1* | 7/2021 | Bala | G06N 20/00 |
| 2021/0358164 | A1* | 11/2021 | Liu | G06V 10/764 |
| 2021/0374513 | A1* | 12/2021 | Sur | G16H 50/20 |
| 2022/0218427 | A1* | 7/2022 | Tomatsu | A61B 90/90 |
| 2022/0239844 | A1* | 7/2022 | Lv | H04N 5/262 |

OTHER PUBLICATIONS

Rameen Abdal, Yipeng Qin, and Peter Wonka. Image2stylegan: How to embed images into the stylegan latent space? In Proceedings of the IEEE international conference on computer vision, pp. 4432-4441, 2.

Rameen Abdal, Yipeng Qin, and Peter Wonka. Image2stylegan++: How to edit the embedded images? In Proceedings of the IEEE/CVF Conference on Computer Vision and Pattern Recognition, pp. 8296-8305, 2020.

Dinesh Acharya, Zhiwu Huang, Danda Pani Paudel, and Luc Van Gool. Towards high resolution video generation with progressive growing of sliced wasserstein gans. arXiv preprint arXiv:1810.02419, 2018.

Andrew Brock, Jeff Donahue, and Karen Simonyan. Large scale gan training for high fidelity natural image synthesis. arXiv preprint arXiv:1809.11096, 2018.

Caroline Chan, Shiry Ginosar, Tinghui Zhou, and Alexei A Efros. Everybody dance now. In Proceedings of the IEEE International Conference on Computer Vision, pp. 5933-5942, 2019.

Cyprien de Masson d'Autume, Shakir Mohamed, Mihaela Rosca, and Jack Rae. Training language gans from scratch. In Advances in Neural Information Processing Systems, pp. 4300-4311, 2019.

Leon A Gatys, Alexander S Ecker, and Matthias Bethge. Image style transfer using convolutional neural networks. In Proceedings of the IEEE conference on computer vision and pattern recognition, pp. 2414-2423, 2016.

Shuyang Gu, Jianmin Bao, Hao Yang, Dong Chen, Fang Wen, and Lu Yuan. Mask-guided portrait editing with conditional gans. In Proceedings of the IEEE Conference on ComputerVisionandPatternRecognition,pp. 3436-3445, 2019.

Ishaan Gulrajani, Faruk Ahmed, Martin Arjovsky, Vincent Dumoulin, and Aaron C Courville. Improved training of wasserstein gans. In Advances in neural information processing systems, pp. 5767-5777, 2017.

Erik Harkonen, Aaron Hertzmann, Jaakko Lehtinen,and Sylvain Paris. Ganspace: Discovering interpretable gan controls. arXiv preprint arXiv:2004.02546, 2020.

Xun Huang, Ming-Yu Liu, Serge Belongie, and Jan Kautz. Multimodal unsupervised image-to-image translation. In Proceedings of the European Conference on Computer Vision (ECCV), pp. 172-189, 2018.

Phillip Isola, Jun-Yan Zhu, Tinghui Zhou, and Alexei A Efros. Image-to-image translation with conditional adversarial networks. In Proceedings of the IEEE conference on computer vision and pattern recognition, pp. 1125-1134, 2017.

Justin Johnson, Alexandre Alahi, and Li Fei-Fei. Perceptual losses for real-time style transfer and super-resolution. In European conference on computer vision, pp. 694-711. Springer, 2016.

Tero Karras, Timo Aila, Samuli Laine, and Jaakko Lehtinen. Progressive growing of gans for improved quality, stability, and variation. arXiv preprint arXiv:1710.10196, 2017.

Tero Karras, Samuli Laine, and Timo Aila. A style-based generator architecture for generative adversarial networks. In Proceedings of the IEEE conference on computer vision and pattern recognition, pp. 4401-4410, 2019.

Tero Karras, Samuli Laine, Miika Aittala, Janne Hellsten, Jaakko Lehtinen, and Timo Aila. Analyzing and improving the image quality of stylegan. In Proceedings of the IEEE/CVF Conference on Computer Vision and Pattern Recognition, pp. 8110-8119, 2020.

Tuomas Kynkaanniemi, Tero Karras, Samuli Laine, Jaakko Lehtinen, and Timo Aila. Improved precision and recall metric for assessing generative models. In Advances in Neural Information Processing Systems, pp. 3927-3936, 2019.

Yuheng Li, Krishna Kumar Singh, Utkarsh Ojha, and Yong Jae Lee. Mixnmatch: Multifactor disentanglement and encoding for conditional image generation. In Proceedings of the IEEE/CVF Conference on Computer Vision and Pattern Recognition, pp. 8039-8048, 2020.

Andreas Lugmayr, Martin Danelljan, and Radu Timofte. Ntire 2020 challenge on real-world image super-resolution: Methods and results. InProceedings of the IEEE/CVF Conference on Computer Vision and Pattern Recognition Workshops, pp. 494-495, 2020.

Thu Nguyen-Phuoc, Chuan Li, Lucas Theis, Christian Richardt, and Yong-Liang Yang. Hologan: Unsupervised learning of 3d representations from natural images. In Proceedings of the IEEE International Conference on Computer Vision, pp. 7588-7597, 2019.

Thu Nguyen-Phuoc, Christian Richardt, Long Mai, Yong-Liang Yang, and Niloy Mitra. Blockgan: Learning 3d object-aware scene representations from unlabelled images.arXiv preprint arXiv:2002.08988, 2020.

Guim Perarnau, Joost Van De Weijer, Bogdan Raducanu, and Jose MAlvarez. Invertible conditional gans for image editing.arXiv preprint arXiv:1611.06355, 2016.

Stanislav Pidhorskyi, Donald A Adjeroh, and Gianfranco Doretto. Adversarial latent autoencoders. InProceedings of the IEEE/CVF Conference on Computer Vision and Pattern Recognition, pp. 14104-14113, 2020.

Scott Reed, Zeynep Akata, Xinchen Yan, Lajanugen Logeswaran, Bernt Schiele, and Honglak Lee. Generative adversarial text to image synthesis.arXiv preprint arXiv:1605.05396, 2016.

Elad Richardson, Yuval Alaluf, Or Patashnik, Yotam Nitzan, Yaniv Azar, Stav Shapiro, and Daniel Cohen-Or. Encoding in style: a stylegan encoder for image-to-image translation. arXiv preprint arXiv:2008.00951, 2020.

Andreas Rossler, Davide Cozzolino, Luisa Verdoliva, Christian Riess, Justus Thies, and Matthias Nießner. Faceforensics: A large-scale video dataset for forgery detection in human faces. arXiv preprint arXiv:1803.09179, 2018.

Tim Salimans, Ian Goodfellow, Wojciech Zaremba, Vicki Cheung, Alec Radford, and Xi Chen. Improved techniques for training gans. In Advances in neural information processing systems, pp. 2234-2242, 2016.

Yujun Shen, Jinjin Gu, Xiaoou Tang, and Bolei Zhou. Interpreting the latent space of gans for semantic face editing. In Proceedings of the IEEE/CVF Conference on Computer Vision and Pattern Recognition, pp. 9243-9252, 2020.

Yujun Shen, Ceyuan Yang, Xiaoou Tang, and Bolei Zhou. Interfacegan: Interpreting the disentangled face representation learned by gans. arXiv preprint arXiv:2005.09635, 2020.

(56) References Cited

OTHER PUBLICATIONS

Aliaksandr Siarohin, Enver Sangineto, Stephane Lathuiliere, and Nicu Sebe. Deformable gans for pose-based human image generation. In Proceedings of the IEEE Conference on Computer Vision and Pattern Recognition, pp. 3408-3416, 2018.
Krishna Kumar Singh, Utkarsh Ojha, and Yong Jae Lee. Finegan: Unsupervised hierarchical disentanglement for fine-grained object generation and discovery. In Proceedings of the IEEE Conference on Computer Vision and Pattern Recognition, pp. 6490-6499, 2019.
Vincent Sitzmann, Justus Thies, Felix Heide, Matthias Nießner, Gordon Wetzstein, and Michael Zollhofer. Deep-voxels: Learning persistent 3d feature embeddings. In Proceedings of the IEEE Conference on Computer Vision and Pattern Recognition, pp. 2437-2446, 2019.
Guy Tevet, Gavriel Habib, Vered Shwartz, and Jonathan Berant. Evaluating text gans as language models. arXiv preprint arXiv:1810.12686, 2018.
Sergey Tulyakov, Ming-Yu Liu, Xiaodong Yang, and Jan Kautz. Mocogan: Decomposing motion and content for video generation. In Proceedings of the IEEE conference on computer vision and pattern recognition, pp. 1526-1535, 2018.
Dmitry Ulyanov, Andrea Vedaldi, and Victor Lempitsky. Deep image prior. In Proceedings of the IEEE Conference on Computer Vision and Pattern Recognition, pp. 9446-9454, 2018.
Yuri Viazovetskyi, Vladimir Ivashkin, and Evgeny Kashin. Stylegan2 distillation for feed-forward image manipulation. arXiv preprint arXiv:2003.03581, 2020.
Ting-Chun Wang, Ming-Yu Liu, Jun-Yan Zhu, Guilin Liu, Andrew Tao, Jan Kautz, and Bryan Catanzaro. Video-to-video synthesis. arXiv preprint arXiv:1808.06601, 2018.
Ting-Chun Wang, Ming-Yu Liu, Jun-Yan Zhu, Andrew Tao, Jan Kautz, and Bryan Catanzaro. High-resolution image synthesis and semantic manipulation with conditional gans. In Proceedings of the IEEE conference on computer vision and pattern recognition, pp. 8798-8807, 2018.
Yifan Wang, Federico Perazzi, Brian McWilliams, Alexan-der Sorkine-Hornung, Olga Sorkine-Hornung, and Christopher Schroers. A fully progressive approach to single-image super-resolution. In Proceedings of the IEEE Conference on Computer Vision and Pattern Recognition Workshops, pp. 864-873, 2018.
Shiping Wen, Weiwei Liu, Yin Yang, Tingwen Huang, and Zhigang Zeng. Generating realistic videos from keyframes with concatenated gans. IEEE Transactions on Circuits and Systems for Video Technology, 29(8):2337-2348, 2018.
Jonas Wulff and Antonio Torralba. Improving inversion and generation diversity in stylegan using a gaussianized latent space. arXiv preprint arXiv:2009.06529, 2020.
Han Zhang, Ian Goodfellow, Dimitris Metaxas, and Augustus Odena. Self-attention generative adversarial networks. In International Conference on Machine Learning, pp. 7354-7363, 2019.
Han Zhang, Tao Xu, Hongsheng Li, Shaoting Zhang, Xiao-gang Wang, Xiaolei Huang, and Dimitris N Metaxas. Stack-gan: Text to photo-realistic image synthesis with stacked generative adversarial networks. In Proceedings of the IEEE international conference on computer vision, pp. 5907-5915, 2017.
Han Zhang, Tao Xu, Hongsheng Li, Shaoting Zhang, Xiao-gang Wang, Xiaolei Huang, and Dimitris N Metaxas. Stack-gan++: Realistic image synthesis with stacked generative adversarial networks. IEEE transactions on pattern analysis and machine intelligence, 41(8):1947-1962, 2018.
Richard Zhang, Phillip Isola, Alexei A Efros, Eli Shechtman, and Oliver Wang. The unreasonable effectiveness of deep features as a perceptual metric. In Proceedings of the IEEE conference on computer vision and pattern recognition, pp. 586-595, 2018.
Long Zhao, Xi Peng, Yu Tian, Mubbasir Kapadia, and Dimitris Metaxas. Learning to forecast and refine residual motion for image-to-video generation. In Proceedings of the European conference on computer vision (ECCV), pp. 387-403, 2018.
Jiapeng Zhu, Yujun Shen, Deli Zhao, and Bolei Zhou. In-domain gan inversion for real image editing. arXiv preprint arXiv:2004.00049, 2020.
Jun-Yan Zhu, Philipp Krahenbuhl, Eli Shechtman, and Alexei A Efros. Generative visual manipulation on the natural image manifold. InEuropean conference on computer vision, pp. 597-613. Springer, 2016.
Jun-Yan Zhu, Taesung Park, Phillip Isola, and Alexei A Efros. Unpaired image-to-image translation using cycle-consistent adversarial networks. In Proceedings of the IEEE international conference on computer vision, pp. 2223-2232, 2017.
Jun-Yan Zhu, Richard Zhang, Deepak Pathak, Trevor Darrell, Alexei A Efros, Oliver Wang, and Eli Shechtman. Toward multimodal image-to-image translation. In Advances in neural information processing systems, pp. 465-476, 2017.
GANPaint Studio; "GANPaint Studio is a demonstration how, with the help of two neural networks (GAN and Encoder). It's easy to start drawing"; Date downloaded Jul. 7, 2021; https://ganpaint.io/demo/?project=church.
Yunjey Choi, Minje Choi, Munyoung Kim, Jung-Woo Ha, Sunghun Kim, and Jaegul Choo. Stargan: Unified generative adversarial networks for multi-domain image-to-image translation. In Proceedings of the IEEE conference on computer vision and pattern recognition, pp. 8789-8797, 2018.
Xun Huang and Serge Belongie. Arbitrary style transfer in real-time with adaptive instance normalization. In Proceedings of the IEEE International Conference on Computer Vision, pp. 1501-1510, 2017.
Taesung Park, Ming-Yu Liu, Ting-Chun Wang, and Jun-Yan Zhu. Gaugan: semantic image synthesis with spatially adaptive normalization. In ACM SIGGRAPH 2019 Real-Time Live!, pp. 1-1. 2019.
R. Abdal et al. in A Style-Based StyleFlow: Attribute-conditioned Exploration of StyleGAN-Generated Images using Conditional Continuous Normalizing Flows, arXiv:2008.02401, (2020).
U.S. Appl. No. 17/034,845, entitled: "Transferring Hairstyles Between Portrait Images Utilizing Deep Latent Representations" filed Sep. 28, 2020.

\* cited by examiner

INITIALIZING A LEARNED LATENT VECTOR FOR NEURAL-NETWORK PROJECTIONS OF DIVERSE IMAGES

BACKGROUND

In recent years, conventional image generating systems have increasingly implemented neural networks to perform computer vision tasks. For instance, conventional systems can use generative adversarial neural networks (GAN) to generate or modify digital images. In one such approach, conventional image generating systems project real data points of an image onto a latent vector that is subsequently utilized by a GAN to reconstruct or modify the image. Indeed, many conventional image generating systems learn high-fidelity latent vectors for each new image to utilize the high-fidelity latent vectors to reconstruct or modify each of the new images. Despite recent advancements in utilizing GANs for image generating and image editing, utilizing GANs to inversely identify latent vectors for editing a corresponding image require large amounts of time, have high computational costs, and cannot easily be utilized to project arbitrarily chosen images with a variety of content into latent vectors for image editing. Accordingly, many conventional image generating systems that utilize GANs to identify latent vectors for image generating and image editing have a number of shortcomings with regard to efficiency, accuracy, and flexibility.

For instance, conventional image generating systems require an inefficient amount of time to project an image into a latent vector for a GAN. In particular, conventional systems often cycle thousands of iterations to learn features of an image and project the image into an accurate latent vector to reconstruct a high-fidelity version of the image using a GAN. In many cases, such conventional systems may require approximately twenty minutes to project a single high-resolution image into a latent vector that a GAN can accurately convert back into a faithfully reconstructed version of the input image. In addition to speed inefficiencies, these conventional systems often consume an inefficient amount of GPU or other computational resources to project each single image into a latent vector.

To mitigate the inefficiencies in speed and computational resource requirements, some conventional image generating systems utilize alternative networks with GANs to project high resolution images into latent vectors. Although such conventional systems improve speed, they oftentimes do so with a significant loss of fidelity to the original input images (from the generated latent vectors). Accordingly, conventional image generating systems often fail to improve the speed at which images are projected to a latent vector while also maintaining accuracy (e.g., high quality and high-fidelity versions of the original input images).

As also suggested above, many conventional image generating systems rigidly utilize GANs for image generating and image editing. For example, some such conventional systems can accurately project images into a latent vector for a GAN only when the images include content within a domain of trained images for the GAN. Indeed, outside of the domain of the trained images, these conventional systems cannot accurately and quickly project arbitrarily chosen images of differing content into the latent vector for the GAN and, rather, are only limited to images similar to the domain of training images.

In addition to having a limited range of useable images, many conventional image generating systems present an impractical solution for generating or modifying images due to their inefficiencies in speed and computational resource requirements. For example, by requiring approximately ten to twenty minutes to project a single high-resolution image into a latent vector for a GAN that can be used to modify the image, many conventional system cannot practically utilize GANs to edit images. Indeed, such speed inefficiencies would require a substantial amount of time to modify large numbers of images (e.g., hundreds or thousands of images) and, thus, such conventional systems are unable to modify images with GANs at a scalable and practical rate.

SUMMARY

This disclosure describes embodiments of systems, non-transitory computer-readable media, and methods that solve one or more of the foregoing problems. For example, the disclosed systems can learn or identify a learned-initialization-latent vector for an initialization digital image and reconstruct a target digital image using an image-generating-neural network based on a modified version of the learned-initialization-latent vector. In particular, in one or more embodiments, the disclosed systems learn a learned-initialization-latent vector from an initialization image utilizing learning iterations on an image-generating-neural network (e.g., a GAN). Such a learned-initialization-latent vector can include at least one latent vector and at least one noise map. Then, the disclosed systems can modify the learned-initialization-latent vector (of the initialization image) to generate modified or reconstructed versions of target images using the image-generating-neural network.

To illustrate, in some embodiments, the disclosed systems utilize the learned-initialization-latent vector as a starting point to learn a latent vector for a target image that an image-generating-neural network converts into a high-fidelity reconstruction of the target image. By starting with the learned-initialization-latent vector, the disclosed systems learn the latent vector for the target image through a reduced number of learning iterations by iteratively modifying the learned-initialization-latent vector until the image-generating-neural network converts the modified learned-initialization-latent vector into either a reconstruction of the target image or a modified version of the target image. By utilizing the learned-initialization-latent vector to learn a high-fidelity latent vector for the target image, the disclosed systems can reduce the time of accurately projecting a given image into a latent vector (of a latent-noise space) for an image-generating-neural network by at least an order of magnitude (e.g., from 10-20 minutes to 2-5 seconds per digital image).

BRIEF DESCRIPTION OF THE DRAWINGS

The detailed description is described with reference to the accompanying drawings in which.

DETAILED DESCRIPTION

Figure 1:
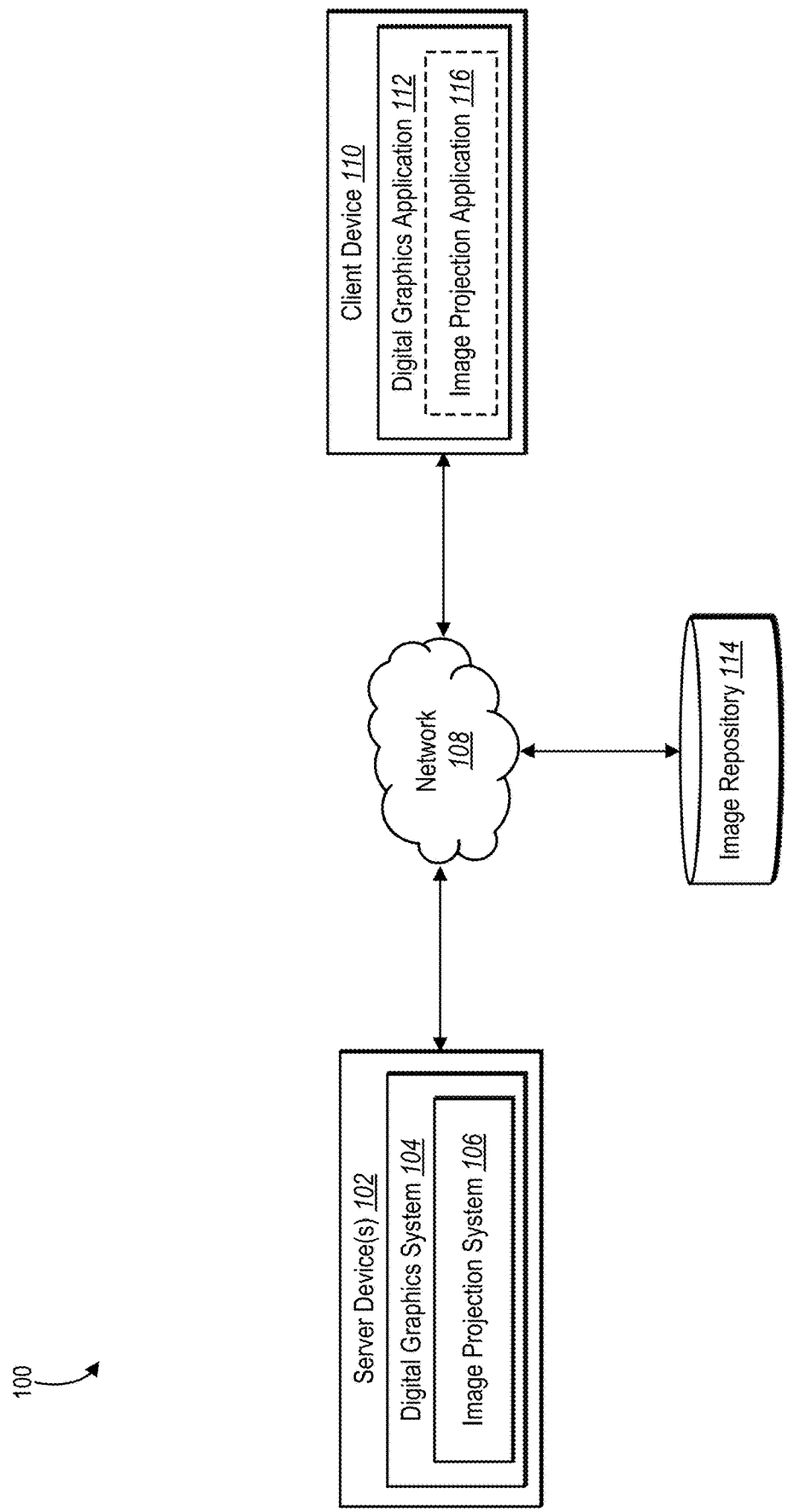
FIG. 1 illustrates a schematic diagram of an example system in which an image projection system operates in accordance with one or more embodiments.

This disclosure describes embodiments of an image projection system that can learn or identify a learned-initialization-latent vector for an initialization digital image and—by iteratively modifying the learned-initialization-latent vector—learn a latent vector that an image-generating-neural network converts into a target digital image or a modified version of the target digital image. For example, the image projection system identifies (or generates) a learned-initialization-latent vector that is learned from an initialization digital image utilizing an image-generating-neural network. The image projection system subsequently modifies the learned-initialization-latent vector until the image-generating-neural network can convert a modified version of the learned-initialization-latent vector into either a faithful reconstruction of a target digital image or a modified version of the target digital image.

To further illustrate, in one or more embodiments, the image projection system identifies (or generates) a learned-initialization-latent vector for an initialization digital image. Such a learned-initialization-latent vector can include at least one latent-feature vector and at least one noise map that, when processed by an image-generating-neural network, convert into a reconstructed version of the initialization digital image. In certain instances, the image projecting system projects an initialization image into a learned-initialization-latent vector by iteratively modifying a latent vector until an image-generating-neural network (e.g., a GAN) can convert the latent vector into a reconstructed version of the initialization image. For example, in some instances, the image projection system iteratively modifies a latent vector for a relatively high number of learning iterations (e.g., 7,500-15,000 iterations) at a high learning rate to generate the learned-initialization-latent vector that accurately reconstructs into the initialization image.

Subsequently, in one or more embodiments, the image projection system utilizes the learned-initialization-latent vector (from an initialization digital image) to reconstruct a target digital image or a modified version of the target digital image utilizing an image-generating-neural network. For instance, the image projection system iteratively modifies the learned-initialization-latent vector until the image-generating-neural network can reconstruct a modified version of the target digital image that reflects modifications requested by a user device.

By starting with and modifying versions of the learned-initialization-latent vector until satisfying a stopping condition, the image-generating-neural network reconstructs a version of the target digital image. Indeed, the image project system can utilize the final modified version of the learned-initialization-latent vector as a learned-latent vector for the target digital image after relatively fewer learning iterations (e.g., 50-100 iterations) than for the learned-initialization-latent vector. In some cases, to satisfy the stopping condition, the image projection system uses the image-generating-neural network to reconstruct a version of a target digital image that satisfies a threshold-satisfying loss between the reconstructed version of the target digital image and the target digital image, modifies the learned-initialization-latent vector for a threshold number of learning iterations, or modifies the learned-initialization-latent vector for a threshold period of time. By generating the learned-latent vector through iterative modifications of the learned-initialization-latent vector, the image projecting system utilizes a significantly reduced number of learning iterations to project subsequent target digital images (e.g., a batch of digital images) to learned-latent vectors (of an image-generating-neural network) in comparison to conventional image generating systems.

After learning a latent vector for a target digital image, in certain implementations, the image projection system further modifies the learned-latent vector by modifying at least one feature latent vector or noise map from the learned-latent vector such that an image-generating-neural network outputs a modified version of the target digital image. For instance, in some embodiments, the image projection system incorporates desired modifications (e.g., stylistic properties, lighting properties) into the learned-latent vector. Upon modification, the modified version of the learned-latent vector converts into a modified version of the target digital image that includes the desired modifications requested by the user.

The disclosed image projection system provides a number of advantages over conventional projection systems. As mentioned above, conventional projection systems require an inefficient amount of time and computer processing to project a single image into a latent vector for a GAN. For instance, a conventional projection system can modify a random latent vector and iteratively convert versions of the latent vector for 10-20 minutes before reconstructing a high-fidelity version of a single image. In contrast to the such conventional systems, the image projection system quickly and accurately projects digital images of varying content into a learned-latent vector for an image-generating-neural network (e.g., a GAN) by at least an order of magnitude faster and with a higher quality. By starting from a learned-initialization-latent vector of an initialization image, the image project system can more quickly learn a latent vector that an image-generating-neural network can convert into a high-fidelity reconstruction of a target digital image. As described above and below, the image project system can also more quickly learn a modified latent vector that an image-generating-neural network can convert into a modified version a target digital image based on a computing device's modification request.

For example, the image projection system projects high resolution target digital images of varying content onto learned-latent vectors that a GAN converts into high fidelity and high-quality reconstructions of the target digital image each within a few seconds (e.g., 2-5 seconds)—by iteratively modifying a learned-initialization-latent vector to learn latent vectors for the target digital images. By contrast, conventional image generating systems that improve the speed of projecting latent vectors often have a substantial loss of fidelity and quality in such reconstructed images. In some instances, the image projection system also projects learned-latent vectors that project finely annotated semantic and panoptic label maps (e.g., having sharp pixel-wise annotations) within image-generating-neural networks with more accuracy than conventional image generating systems (e.g., utilizing a Cityscape image dataset with the image-generating-neural network).

In addition to quicker speeds, the image projection system also efficiently utilizes computational resources. More specifically, in one or more embodiments, the image projection system improves GPU processing speeds by utilizing less learning iterations to project images onto learned-latent vectors for target digital images using an image-generating-neural network as compared to conventional image generating systems. By utilizing fewer learning iterations per target digital image, the image projection system also utilizes less GPU processing power or fewer other computational resources, without a loss of quality, in comparison to conventional image generating systems.

Beyond faster computing speeds and more efficient processing, unlike conventional image generating systems, the image projection system generates—at a high quality and with improved speeds—learned-latent vectors for target digital images of varying content that are not part of a domain of trained digital images for an image-generating-neural network. By doing so, in many instances, the image projection system easily utilizes image-generating-neural networks to generate modified versions of digital images of varying content (from the projected learned-latent vectors) without being constrained to digital images similar to those that have been pretrained on the image-generating-neural network.

Due to the improved speed, the image projection system can practically scale up to project batch digital images (e.g., hundreds or thousands of images) and/or various numbers of digital target images into learned-latent vectors using an image-generating-neural network. For example, unlike conventional image generating systems that require a substantial amount of time to learn latent vectors per image (e.g., 10-20 minutes), the image projection system practically and timely projects and/or modifies batch digital target images (e.g., at 2-5 seconds per image).

As illustrated by the foregoing discussion, the present disclosure utilizes a variety of terms to describe features and advantages of the image projection system. Additional detail is now provided regarding the meaning of such terms. For example, as used herein, the term "digital image" (sometimes referred to as "image") refers to a digital symbol, picture icon, and/or other visual illustration depicting one or more objects. For instance, an image includes a digital file having a visual illustration and/or depiction of a person or a face (e.g., a portrait image). In some embodiments, an image includes, but is not limited to, a digital file with the following extensions: JPEG, TIFF, BMP, PNG, RAW, or PDF. In addition, in certain instances, an image includes a digital frame of a digital video. In particular, in one or more embodiments, an image includes a digital frame within, but not limited to, a digital file with the following extensions: MP4, MOV, WMV, AVI, or AVI.

Additionally, in certain instances, an initialization digital image includes a digital image utilized to learn a learned-initialization-latent vector for an image-generating-neural network. Furthermore, in some embodiments, a target digital image includes a digital image that is reconstructed or modified by modifying a learned-initialization-latent vector and using an image-generating-neural network. Indeed, in certain instances, the image projection system iteratively modifies a learned-initialization-latent vector to learn a latent vector that, when processed by an image-generating-neural network, converts into a high-fidelity version of the target digital image. In some instances, the image projection system iteratively modifies the learned-initialization-latent vector until a modified version of the learned-initialization-latent vector, when processed by the image-generating-neural network, converts into a modified version of the target digital image. For example, a target digital image includes a digital image provided by a client device to the image projection system for reconstruction and/or modification.

Furthermore, as used herein, the term the term "neural network" refers to a machine learning model that can be trained and/or tuned based on inputs to determine classifications or approximate unknown functions. For example, a neural network includes a model of interconnected artificial neurons (e.g., organized in layers) that communicate and learn to approximate complex functions and generate outputs (e.g., generated digital images) based on a plurality of inputs provided to the neural network. In some cases, a neural network refers to an algorithm (or set of algorithms) that implements deep learning techniques to model high-level abstractions in data.

Relatedly, the term "image-generating-neural network" refers to a neural network that generates images based on latent vectors (e.g., latent-feature vectors and/or noise maps). In some cases, an image-generating-neural network includes a neural network that reconstructs target digital images from learned latent vectors. In some embodiments, an image-generating-neural network includes a neural network that encodes images into a latent vector (within a latent vector space) and decodes (or converts) the latent vectors to synthesize (or reconstruct) an image.

In one or more embodiments, the image-generating-neural network includes a generative adversarial neural network (GAN). For example, the image-generating-neural network includes a GAN that is trained on a dataset of facial images (e.g., Flickr-Faces-HQ dataset, CELEB-HQ dataset) to generate facial images from latent vectors. In some embodiments, the image projection system utilizes an image-generating-neural network based on a variety of neural network models such as, but not limited to, an unconditional GAN, a Deep Convolutional GAN (DCGAN), and/or a conditional GAN (cGAN). In addition to or as an alternative to a GAN, in some embodiments, the image projection systems utilize recurrent neural networks (RNN) and/or convolutional neural networks (CNN) to generate digital images from latent vectors. For example, in some instances, the image projection system utilizes a PixelRNN, a PixelCNN, or a PixelCNN++ to generate a digital image from a latent vector.

In certain instances, the image projection system utilizes a GAN (as the image-generating-neural network) that utilizes a mapping network to convert a random latent vector (e.g., a Z vector with a Z-space) to a latent vector that represents facial or other object attributes. Subsequently, in some embodiments, the GAN (utilized by the image projection system) uses a synthesis network to convert the latent vector that represents the facial or object attributes to a generated (or constructed) digital image. Indeed, in one or more embodiments, the GAN (utilized by the image projection system) is learned using facial images to generate facial digital images (e.g., portrait images depicting a person). As an example, in some embodiments, the image projection system utilizes a StyleGAN as described by R. Abdal et al. in *A Style-Based StyleFlow: Attribute-conditioned Exploration of StyleGAN-Generated Images using Conditional Continuous Normalizing Flows*, arXiv: 2008.02401, (2020), the content of which is hereby incorporated by reference in its entirety (hereinafter *A Style-Base StyleFLow*). Another example of a GAN includes a StyleGAN2 described by T. Karras et al. in *A Style-Based Generator Architecture for Generative Adversarial Networks*, In Proceedings of the IEEE Conference on Computer Vision and Pattern Recognition, pages 4401-4410, 2019, the content of which is hereby incorporated by reference in its entirety (hereinafter Karras).

Moreover, as used herein, the term "latent vector" refers to data that embeds latent (or hidden) features of a digital image that, when processed with an image-generating-neural network, converts into a digital image depicting the features. For instance, a latent vector includes one or more latent-feature vectors and one or more noise maps that, when utilized with an image-generating-neural network, convert into a digital image. In some embodiments, a latent vector includes a concatenation of at least one latent-feature vector and at least one noise map. In certain instances, the image projection system utilizes a latent vector to generate an image and/or a modified version of an image utilizing an image-generating-neural network. In some instances, a latent vector includes a Z-vector of a GAN (as described in *A Style-Based StyleFlow* and Karras). In addition, in one or more embodiments, a latent vector includes a latent-feature vector and/or a noise map from a latent-noise space as described by R. Abdal et al. in *Image2StyleGAN. How to embed images into the stylegan latent space?*, In Proceedings of the IEEE International Conference on Computer Vision, pages 4432-4441, 2019, the content of which is hereby incorporated by reference in its entirety (hereinafter *Image2StyleGAN*). Furthermore, in certain instances, a latent vector is within a latent-noise space (WN latent-noise space and/or W$^+$N latent-noise space) as described by R. Abdal et al. in *Image2StyleGAN++: How to edit the embedded images?*, In Proceedings of the IEEE International Conference on Computer Vision, pages 8296-8305, 2020, the content of which is hereby incorporated by reference in its entirety (hereinafter *Image2StyleGAN++*).

Moreover, in one or more embodiments, the image projection system generates (or identifies) a learned-initialization-latent vector from a latent vector by projecting an initialization image into a latent vector (of a latent-noise space) for an image-generating-neural network. More specifically, in some embodiments, the image projection system learns a learned-initialization-latent vector from a latent vector (e.g., a random latent vector) by iteratively modifying the latent vector for a number of learning iterations until a modified version of the latent vector, when utilized with an image-generating-neural network, converts into a reconstructed version of the initialization image (as described in greater detail below). Furthermore, in one more embodiments, the image projection system generates a learned-latent vector for a target digital image by iteratively modifying the learned-initialization-latent vector for less learning iterations than utilized for the learned-initialization-latent vector (as described in greater detail below). In one or more embodiments, a learning iteration includes the process of utilizing a latent vector to generate a synthesized digital image, determining a loss between the synthesized digital image and a comparison image (e.g., an initialization digital image or a target digital image), and modifying the latent vector based on the determined loss.

Additionally, as used herein, the term "latent-feature vector" refers to a set of values representing characteristics and/or attributes (i.e., features) of digital images (or frames of a digital video). In some embodiments, a latent-feature vector includes data representing characteristics (or features) of pixels of a digital image (e.g., hidden activation values). For example, an image-generating-neural network extracts (or encodes) features for a latent-feature vector from a digital image utilizing one or more layers of the image-generating-neural network. In such implementations, while these feature values (of the latent-feature vector) are not recognizable to a user, they nonetheless characterize the facial and/or other object features of a digital image. Indeed, in certain instances, the latent values of a latent-feature vector include latent or custom features that an image-generating-neural network is trained to identify features, such as, but not limited to, object height, width, shape, color, object features (e.g., eyes, nose, mouth, hair), or pixel intensities.

Furthermore, in some embodiments, a latent-feature vector includes a set of numeric metrics learned by a machine learning algorithm. For example, in some embodiments, the image projection system utilizes an image-generating-neural network to encode visual (and/or latent) features of a digital image into a latent-feature vector. In addition, in one or more embodiments, the image projection system utilizes the image-generating-neural network to decode a latent-feature vector to synthesize (or construct) a digital image that depicts visual features represented within the latent-feature vector. In some instances, the latent-feature vector includes one or more latent-feature vectors w from the W latent space and/or extended W$^+$ latent space as described by *Image2StyleGAN* and/or *Image2StyleGAN++*.

Moreover, as used herein, the term "noise map" refers to a set of pixels that represent (or depict) noise within an image. In particular, in one or more embodiments, a noise map includes an image depicting random noise through random noise pixels (e.g., a random noise map). In some embodiments, the image projection system inputs one or more noise maps into an image-generating-neural network (e.g., a GAN) as a partial basis for generating a digital image. In some embodiments, the image projection system utilizes multiple noise maps having various resolution sizes (e.g., a 4×4 noise map, an 8×8 noise map, a 16×16 noise map, 1024×1024 noise map).

In addition, as used herein, the term "loss" refers to a value representing a value or an amount of error determined between a synthesized (or constructed) version of a digital image (from an image-generating-neural network) compared to the original digital image. More specifically, in one or more embodiments, a loss includes a value that indicates the accuracy of a synthesized (or constructed) version of a digital image from an image-generating-neural network. For example, the image projection system determines a loss between a synthesized version of a digital image and the original digital image to determine the accuracy of the synthesized version of the digital image. In some instances, a loss includes, but is not limited to, a mean square loss (MSE), a perceptual loss, a quadratic loss, an L2 loss, and/or learned perceptual image patch similarities (LPIPS).

Turning now to the figures, FIG. 1 illustrates a schematic diagram of one embodiment of a system 100 (or environment) in which an image projection system 106 operates in accordance with one or more embodiments. As illustrated in FIG. 1, the system includes server device(s) 102, a network 108, a client device 110, and an image repository 114. As further illustrated in FIG. 1, the server device(s) 102, the client device 110, and the image repository 114 communicate via the network 108.

As shown in FIG. 1, the server device(s) 102 include a digital graphics system 104 that further includes the image projection system 106. For instance, the server device(s) 102 includes, but is not limited to a computing device (as explained below with reference to FIG. 11). In one or more embodiments, the image projection system 106 identifies a learned-initialization-latent vector that is learned from an initialization digital image (using an image-generating-neural network). Furthermore, in some embodiments, the image projection system 106 receives request to modify a target digital image from the client device 110. Based on the request, in certain instances, the image projection system 106 modifies the target digital image. For example, the image projection system 106 generates a learned-latent vector for the target image by iteratively modifying the learned-initialization-latent vector until a modified version of the learned-initialization-latent vector converts into a version of the target digital image (using the image-generating-neural network). Then, in certain instances, the image projection system 106 modifies the learned-latent vector and utilizes the image-generating-neural network to convert the modified learned-latent vector into a modified version of the target digital image (as described above and further below).

Furthermore, as shown in FIG. 1, the system 100 includes the client device 110. In one or more embodiments, the client device 110 includes, but is not limited to, a mobile device (e.g., smartphone, tablet), a laptop, a desktop, or any other type of computing device, including those explained below with reference to FIG. 11. In some embodiments, although not shown in FIG. 1, the client device 110 is operated by a user to perform a variety of functions (e.g., via a digital graphics application 112). For example, the client device 110 (through the digital graphics application 112) performs functions such as, but not limited to, sending digital images and/or sending requests to modify digital images to the image projection system 106. In addition, in some embodiments, the client device 110 also receives modified versions of digital images from the image projection system 106.

To access the functionalities of the image projection system 106 (as described above and in greater detail below), in one or more embodiments, a user interacts with the digital graphics application 112 on the client device 110. For example, the digital graphics application 112 includes one or more software applications (e.g., to interact with and/or modify images in accordance with one or more embodiments herein) installed on the client device 110. In certain instances, the digital graphics application 112 is hosted on the server device(s) 102. Additionally, when hosted on the server device(s) 102, the digital graphics application 112 is accessed by the client device 110 through a web browser and/or another online interfacing platform and/or tool.

Although FIG. 1 illustrates the image projection system 106 being implemented by a particular component and/or device within the system 100 (e.g., the server device(s) 102), in some embodiments the image projection system 106 is implemented, in whole or part, by other computing devices and/or components in the system 100. For instance, in some embodiments, the image projection system 106 is implemented on the client device 110 within an image projection application 116. More specifically, in one or more embodiments, the description of (and acts performed by) the image projection system 106 are implemented (or performed by) the image projection application 116 when the client device 110 implements the image projection system 106. In particular, in some embodiments, the client device 110 (via an implementation of the image projection system 106 on the image projection application 116) generates (or identifies) a learned-initialization-latent vector, generates a learned-latent vector for a target digital image using the learned-initialization-latent vector, and utilizes the learned-latent vector with an image-generating-neural network to generate a modified version of the target digital image in accordance with one or more embodiments.

As further shown in FIG. 1, the system 100 includes the image repository 114. In one or more embodiments, the image repository 114 includes, but is not limited to, a server device, a cloud service computing device, or any other type of computing device (including those explained below with reference to FIG. 11) that stores one or more digital images. In some embodiments, the image projection system 106 accesses the image repository 114 to retrieve one or more digital images. For example, the image projection system 106 utilizes images from the image repository 114 to generate learned-initialization-latent vectors, learned-latent vectors for various numbers of digital images (e.g., an image batch), and/or modifies various digital images in accordance with one or more embodiments. In some instances, the image projection system 106 performs the above-mentioned tasks upon receiving a request from the client device 110 to utilize digital images from the image repository 114.

Additionally, as shown in FIG. 1, the system 100 includes the network 108. As mentioned above, in some instances, the network 108 enables communication between components of the system 100. In certain embodiments, the network 108 includes a suitable network and may communicate using any communication platforms and technologies suitable for transporting data and/or communication signals, examples of which are described with reference to FIG. 11. Furthermore, although FIG. 1 illustrates the server device(s) 102, the client devices 110, and the image repository 114 communicating via the network 108, in certain embodiments, the various components of the system 100 communicate and/or interact via other methods (e.g., the server device(s) 102 and the client device 110 communicating directly).

As previously mentioned, in one or more embodiments, the image projection system 106 projects a target digital image into a latent vector for an image-generating-neural network utilizing a learned-initialization-latent vector learned from an initialization digital image. For example, FIG. 2 illustrates the image projection system 106 identifying a learned-initialization-latent vector, receiving a request to modify a target digital image, and modifying the learned-initialization-latent vector as a basis for generating a modified version the target digital image using an image-generating-neural network (e.g., by generating and modifying a learned-latent vector for the target digital image).

Figure 2:
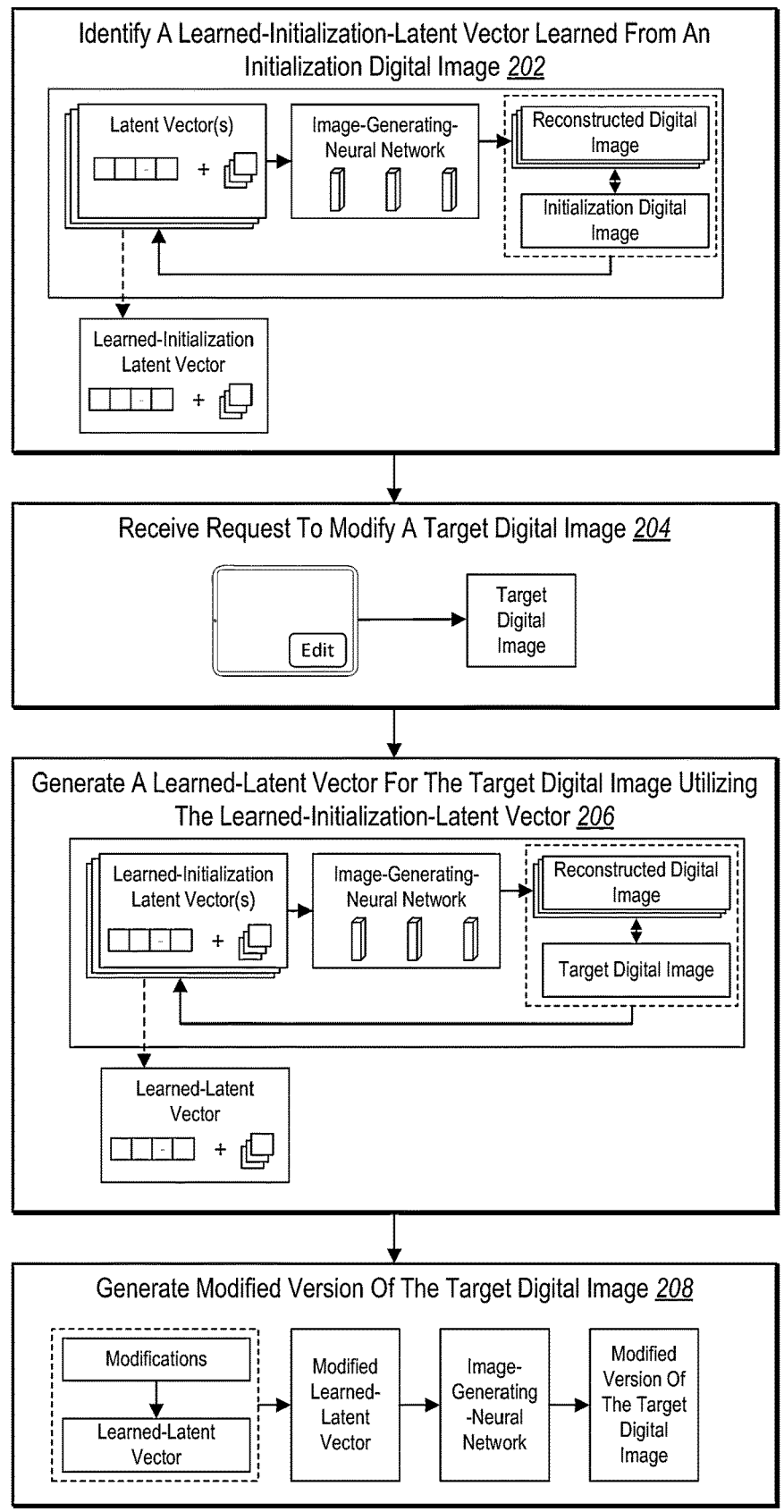
FIG. 2 illustrates an overview of an image projection system generating a modified version of a target digital image utilizing a learned-initialization-latent vector in accordance with one or more embodiments.

As shown in an act 202 of FIG. 2, the image projection system 106 identifies a learned-initialization-latent vector learned from an initialization digital image. For example, as illustrated in the act 202 of FIG. 2, the image projection system 106 iteratively modifies a latent vector until the image-generating-neural network reconstructs a version of the initialization image. In certain instances, the image projection system 106 iteratively modifies the latent vector based on a loss determined from a comparison between reconstructed digital images and the initialization digital image, a threshold number of learning iterations, or a threshold period of time. Indeed, the image projection system 106 continues to iteratively modify the latent vector until the loss satisfies a threshold loss (e.g., to indicate a high-fidelity reconstruction of the initialization digital image), a threshold number of learning iterations is satisfied (e.g., 7,500; 10,000; or 15,000 iterations), or a threshold period of time passes (e.g., 10 minutes, 15 minutes, 20 minutes). As mentioned above, the image projection system 106 utilizes various image-generating-neural networks that generate images from latent vectors having latent-feature vectors and/or noise maps (e.g., a GAN, a DCGAN, cGAN).

Furthermore, as shown in the act 202 of FIG. 2, the image projection system 106 utilizes a particular modified version of the latent vector that reconstructs into the version of the initialization image as the learned-initialization-latent vector. In some instances, the image projection system 106 identifies a learned-initialization-latent vector that is learned from an initialization digital image utilizing the above-mentioned approach. Indeed, the image projection system 106 identifying (or generating) the learned-initialization-latent vector is described in greater detail below (e.g., in relation to FIG. 3).

Furthermore, as illustrated in an act 204 of FIG. 2, the image projection system 106 receives a request to modify a target digital image. In some instances, as shown in FIG. 2, the request to modify the target digital image is provided to the image projection system 106 by a client device. Indeed, as further illustrated in FIG. 2, the image projection system 106 receives an arbitrarily chosen target digital image from a client device in the act 204. In some embodiments, the image projection system 106 receives the request from the client device to modify the target digital image that is stored within the server device(s) 102 and/or the image repository 114. For example, upon receiving the request to modify the target digital image, the image projection system 106 modifies the learned-initialization-latent vector (from the act 202) to generate a learned-latent vector that corresponds to the target digital image. By further modifying the learned-latent vector for the target digital image, the image projection system 106 can also modify the target digital image using the image-generating-neural network.

To illustrate, the image projection system 106 generates a learned-latent vector for the target digital image utilizing the learned-initialization-latent vector in an act 206 of FIG. 2. As shown in the act 206 of FIG. 2, the image projection system 106 iteratively modifies the learned-initialization-latent vector (from the act 202) until the image-generating-neural network reconstructs a version of the target digital image based on a loss determined between reconstructed digital images and the target digital image. As further shown in the act 206, the image projection system 106 utilizes a particular modified version of the learned-initialization-latent vector (as the learned-latent vector for the target digital image) when that modified version of the learned-initialization-latent vector converts into the version of the target digital image. In one or more embodiments, the image projection system 106 generates the learned-latent vector (in the act 206) that converts into a high fidelity and high quality version of the target digital image utilizing fewer learning iterations than the image projection system 106 utilized to generate the learned-initialization-latent vector (in the act 202). Indeed, the image projection system 106 generating a learned-latent vector for a target digital image by modifying a learned-initialization-latent vector is described in greater detail below (e.g., in FIGS. 4A, 4B, and 5).

As further shown in FIG. 2, the image projection system 106 generates a modified version of the target digital image in an act 208. More specifically, as shown in FIG. 2, the image projection system 106 implements (or utilizes) requested modifications (e.g., from the act 204) on the learned-latent vector (from the act 206) to generate a modified learned-latent vector. For example, the image projection system 106 modifies one or more feature latent-vectors or one or more noise maps that control features and/or attributes of the target digital image to generate the modified learned-latent vector.

After modifying the learned-latent vector, as shown in the act 208 of FIG. 2, the image projection system 106 utilizes the image-generating-neural network to convert the modified learned-latent vector into the modified version of the target digital image (e.g., reflecting the requested modifications). In some instances, the image projection system 106 directly modifies the learned-initialization-latent vector to identify a modified version of the learned-initialization-latent vector that the image-generating-neural network converts into a modified version of the target digital image. Indeed, generating a modified target digital image from a learned-latent vector (or modified learned-initialization-latent vector) is described in greater detail below (e.g., in relation to FIGS. 4B and 6).

Figure 3:
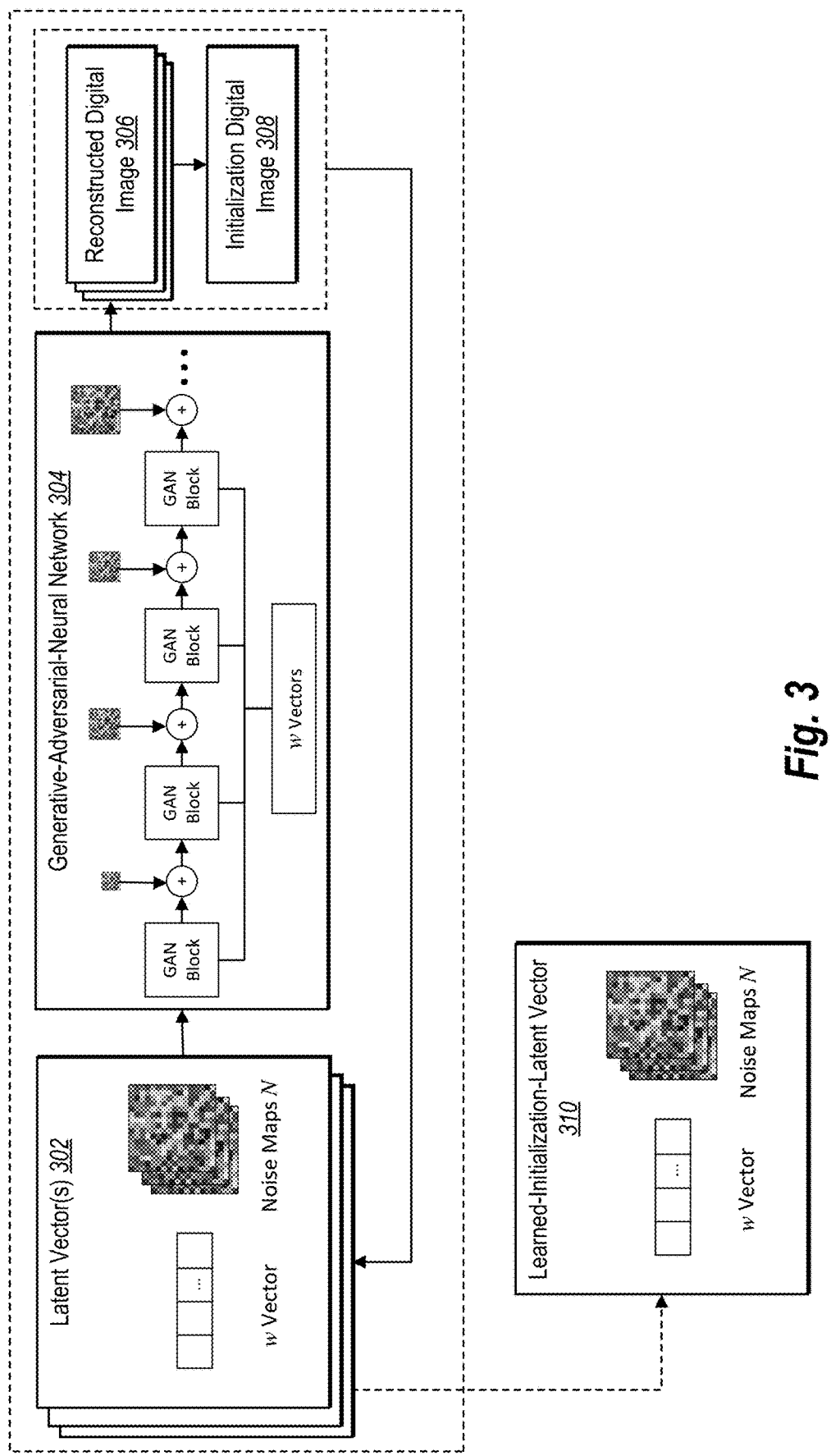
FIG. 3 illustrates an image projection system generating a learned-initialization-latent vector in accordance with one or more embodiments.

As mentioned above, in one or more embodiments, the image projection system 106 identifies a learned-initialization-latent vector learned from an initialization digital image utilizing an image-generating-neural network. For example, FIG. 3 illustrates the image projection system 106 utilizing an initialization digital image and a GAN to generate a learned-initialization-latent vector. As shown in FIG. 3, the image projection system 106 iteratively modifies a latent vector until the GAN reconstructs a version of the initialization image based on a loss determined between reconstructed digital images and the initialization digital image.

As shown in FIG. 3, the image projection system 106 utilizes a randomly initialized latent vector 302 having a latent-feature vector w and multiple noise maps N. Then, the image projection system 106 utilizes the generative adversarial neural network 304 to convert the latent vector 302 into a reconstructed digital image 306. In particular, the image projection system 106 inputs a feature-latent vector w into each GAN block of the generative adversarial neural network 304. Furthermore, the image projection system 106 broadcasts noise maps N having various resolution sizes within channels of the GAN blocks of the generative adversarial neural network 304. In one or more embodiments, the GAN blocks include convolution layers of the generative adversarial neural network 304. Furthermore, in some instances, the GAN blocks of the generative adversarial neural network 304 include various generator style blocks that have convolution layers.

As further illustrated in FIG. 3, upon converting the latent vector 302 into the reconstructed digital image 306 using the generative adversarial neural network 304, the image projection system 106 compares the reconstructed digital image 306 to an initialization digital image 308. In some instances, the image projection system 106 determines a loss between the reconstructed digital image 306 and the initialization digital image 308. Subsequently, as shown in FIG. 3, the image projection system 106 utilizes the determined loss to modify the latent vector 302. Indeed, in one or more embodiments, the image projection system 106 modifies one or both of the feature-latent vector and one or more noise maps of the latent vector 302 to reduce the loss between the reconstructed digital image 306 and the initialization digital image 308. In some embodiments, image projection system 106 identifies a reduced loss that indicates that the reconstructed digital image 306 is a reconstructed version of the initialization digital image 308.

As shown in FIG. 3, the image projection system 106 iteratively modifies the latent vector 302 until the reconstructed digital image 306 is a reconstructed version of the initialization digital image 308. Specifically, upon modifying the latent vector 302 using the loss from between the reconstructed digital image 306 and the initialization digital image 308, the image projection system 106 utilizes the modified version of the latent vector 302 with the generative adversarial neural network 304 to generate additional versions of the reconstructed digital image 306. As shown in FIG. 3, in learning iteration by learning iteration, the image projection system 106 compares the additional versions of the reconstructed digital image 306 with the initialization digital image 308 to determine additional losses. Indeed, as shown in FIG. 3, the image projection system 106 modifies additional versions of the latent vector 302 based on the additional losses.

In one or more embodiments, the image projection system 106 continues the learning iterations until a version of the reconstructed digital image 306 represents a version of the initialization digital image 308. For example, the image projection system 106 continues the learning iterations until a comparison between a version of the reconstructed digital image 306 and the initialization digital image 308 results in a threshold-satisfying loss that indicates that the reconstructed digital image 306 is an accurate reconstructed version of the initialization digital image 308. As shown in FIG. 3, upon determining that a version of the reconstructed digital image 306 represents a version (e.g., a high-fidelity version) of the initialization digital image 308, the image projection system 106 utilizes the corresponding modified version of the latent vector 302 as a learned-initialization-latent vector 310.

In some embodiments, as shown in FIG. 3, the image projection system 106 utilizes a singular latent-feature vector w within the GAN to learn a learned-initialization-latent vector for an initialization digital image. By contrast, in certain instances, the image projection system 106 utilizes multiple latent-feature vectors w (from an extended latent-feature vector space) for the various GAN blocks of the GAN. For example, in some embodiments, the image projection system 106 optimizes and inputs a different (or unique) latent-feature vector w for each convolution layer inside various GAN blocks (e.g., generator style blocks).

In addition to the latent-feature vector w, FIG. 3 also illustrates the image projection system 106 broadcasting multiple noise maps N that are part of the randomly initialized latent vector 302 within channels of the GAN blocks of the generative adversarial neural network 304. Indeed, as shown in FIG. 3, the image projection system 106 utilizes noise maps N having various resolution sizes. For example, the image projection system 106 broadcasts a random noise map having a first resolution into a first channel C and two increasing resolution n×n random noise maps for subsequent channels of the GAN blocks. For example, the image projection system 106 utilizes a 4×4 noise map in a first channel of the GAN, followed by two 8×8 noise maps in the two subsequent channels, followed by two 16×16 noise maps in the two subsequent channels of the GAN, and so forth (e.g., 8×8, 16×16, . . . , 1024×1024 noise maps). To illustrate, in one or more embodiments, the image projection system 106 broadcasts a noise sample $N_i \in \mathbb{R}^{B \times 1 \times H \times W}$ over C channels of the GAN. In addition, in one or more embodiments, the image projection system 106 scales each noise map utilizing a learned channel weight ($\gamma_c$) and adds a resulting noise tensor to a generator latent output $L_i \in \mathbb{R}^{B \times 1 \times H \times W}$ of the GAN.

In some instances, the image projection system 106 projects an initialization digital image into a learned-initialization-latent vector utilizing a GAN with a latent-noise space as described by *Image2StyleGAN*. Furthermore, in some embodiments, the image projection system 106 projects an initialization digital image into a learned-initialization-latent vector utilizing a GAN with a latent-noise space as described by *Image2StyleGAN++*. Indeed, in one or more embodiments, the image projection system 106 utilizes the generated learned-initialization-latent vector (from *Image2StyleGAN* and/or *Image2StyleGAN++*) as a learned prior to project subsequent digital images (e.g., an arbitrary target digital image) into learned-latent vectors in less time (e.g., in less learning iterations).

In some instances, the image projection system 106 utilizes a modified learning rate (e.g., a large learning rate compared to the learning rate described by *Image2StyleGAN* and/or *Image2StyleGAN++*) with a singular latent-feature vector w and one or more noise maps N within the GAN to learn a learned-initialization-latent vector for an initialization digital image (e.g., latent vector Z). By utilizing the larger learning rate, the image projection system 106 generates a latent vector having a singular latent-feature vector w that, when processed by an image-generating-neural network, produces a reconstructed output with nearly imperceptible differences compared to a reconstructed output from an extended latent vector having multiple latent-feature vectors w (e.g., from a W⁺N latent-noise space).

Furthermore, in some embodiments, the image projection system 106 utilizes a same learning rate (e.g., constant) across different learning iterations to learn a learned-initialization-latent vector for an initialization digital image. For example, the image projection system 106 removes learning rate ramp-ups to utilize the same learning rate (e.g., constant) across different learning iterations while learning a learned-initialization-latent vector for an initialization digital image. Additionally, in some embodiments, the image projection system 106 removes a common learning rate ramp-up while also reducing a linearly annealing learning rate ramp-down period (e.g., to a lesser number of the last learning iterations) while learning a learned-initialization-latent vector for an initialization digital image.

As mentioned above, in certain implementations, the image projection system 106 iteratively modifies a latent vector to generate a learned-initialization-latent vector utilizing losses between image reconstructions (from modified version of the latent vector) and an initialization digital image. In some instances, the image projection system 106 utilizes various combinations of losses, such as, but not limited to, an MSE loss (e.g., pixel-wise MSE), a perceptual loss, or LPIPS loss. For example, in some cases, the image projection system 106 optimizes a loss L between outputs of a neural network f with an input latent vector z (having initialized neural network parameters θ) and an image $x_0$ to determine the learned-initialization-latent vector utilizing the following function:

$$L = \min_{\theta} \| f_\theta(z) - x_0 \|^2.$$

Additionally, in one or more embodiments, the image projection system 106 utilizes a loss between reconstructed images generated by the GAN and the initialization digital image as a basis to modify latent vectors (e.g., the one or more latent-feature vector inputs and/or noise maps) while keeping neural network parameters constant (e.g., keeping θ constant in the above mentioned loss function).

Furthermore, in some embodiments, the image projection system 106 iteratively modifies a randomly initialized latent vector ($z_m$) for an m number of learning iterations with a loss L and a learning rate η using an initialization digital image I and generator network G(•) to generate a learned-initialization-latent vector $z_{INIT}$ in accordance with the following function:

$$z_{i+1} = z_i - \eta L(G(z_i) - I).$$

In certain instances, the image projection system 106 utilizes various numbers of learning iteration in the above-mentioned function to generate a learned-initialization-latent vector $Z_{INIT}$ (e.g., m=15000, m=9000, m=7500). In addition, in some embodiments, the image projection system 106 utilizes various learning rates η to generate the learned-initialization-latent vector $z_{INIT}$ (e.g., η=3.8, η=3.5, η=4).

As also shown in FIG. 3, the image projection system 106 utilizes an initialization digital image to generate a learned-initialization-latent vector. In one or more embodiments, the image projection system 106 utilizes an initialization digital image that is selected (or received from) a client device (e.g., as a user selection on the client device or an image repository). In certain instances, the image projection system 106 utilizes a digital image from a set of digital images from the client device or an image repository as the initialization digital image (e.g., a first digital image or a randomly selected digital image from the set of digital images).

Furthermore, in some instances, the image projection system 106 identifies or selects an initialization digital image based on stylistic properties or attributes depicted within a given digital image. For example, the image projection system 106 selects a digital image having various stylistic properties (e.g., a painting effect, lighting effect, blending effect, color scheme) and/or various depicted attributes (e.g., a hairstyle, type of person, type of object, type of animal) as the initialization digital image. Subsequently, in one or more embodiments, the image projection system 106 generates a learned-initialization-latent vector that is learned for the given stylistic properties and/or depicted attributes from the selected initialization digital image. In some instances, the image projection system 106 then directly modifies the stylistic-property-specific learned-initialization-latent vector and/or depicted-attribute-specific learned-initialization-latent vector such that a GAN converts the modified version of the learned-initialization-latent vector into a modified version of a target digital that incorporates the same stylistic properties and/or depicted attributes.

Moreover, in certain cases, the image projection system 106 generates and stores various learned-initialization-latent vectors learned from various initialization digital images. For example, the image projection system 106 generates a collection of learned-initialization-latent vectors from different initialization digital images having varied stylistic properties and/or depicted attributes. Then, in one or more embodiments, the image projection system 106 identifies (e.g., selects) a learned-initialization-latent vector from the collection of learned-initialization-latent vectors upon receiving a request to modify a target digital image. Indeed, in certain instances, the image projection system 106 identifies a learned-initialization-latent vector from an initialization digital image that matches the target digital image (e.g., based on matching stylistic properties, matching depicted attributes, and/or matching various features of the digital images). Then, in one or more embodiments, the image projection system 106 utilizes the identified (or selected) learned-initialization-latent vector to learn a learned-latent vector for the target digital image (e.g., to modify the target digital image).

Figure 4A:
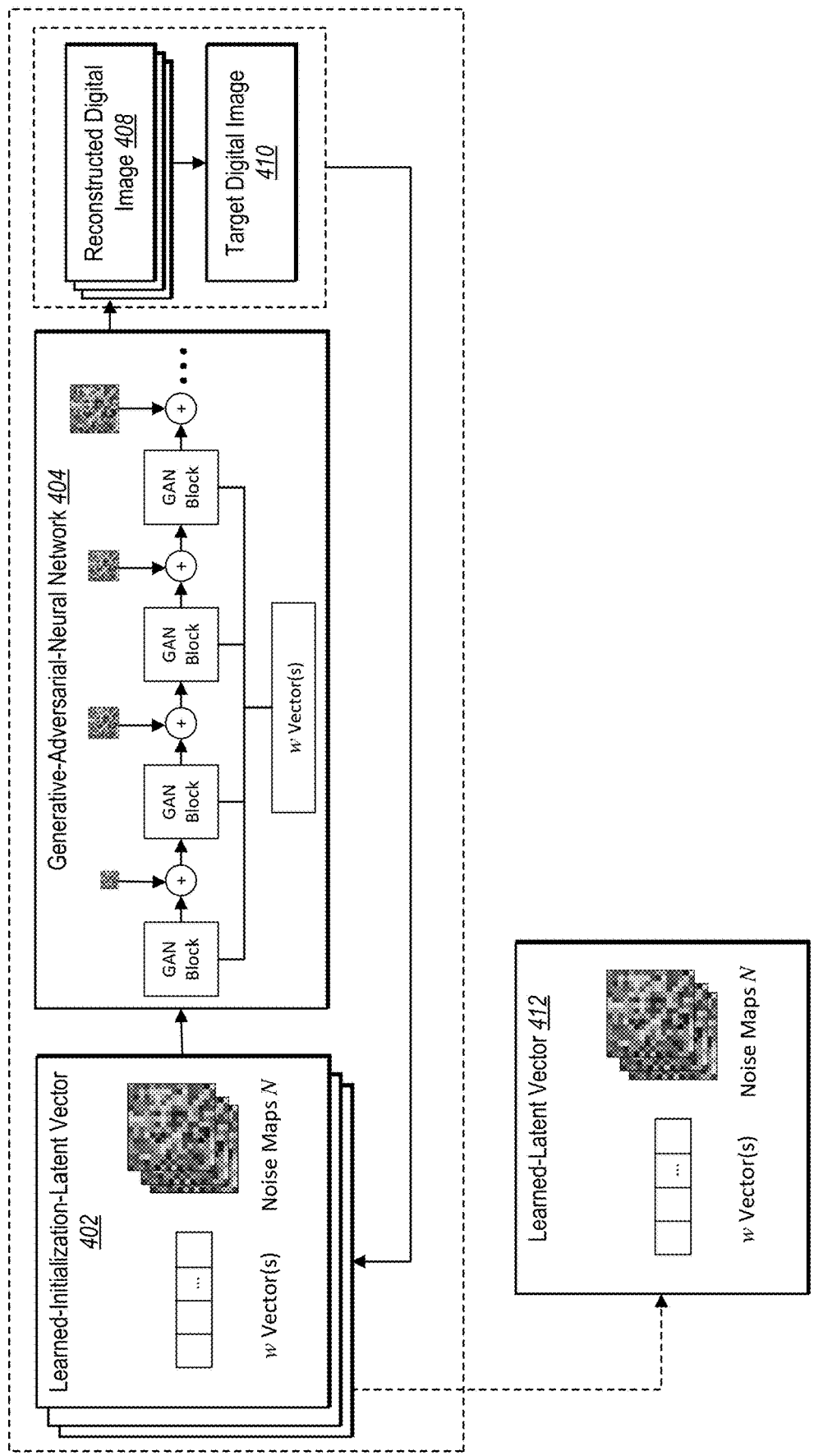
FIG. 4A illustrates an image projection system generating a learned-latent vector for a target digital image based on modified versions of a learned-initialization-latent vector in accordance with one or more embodiments.
Figure 4B:
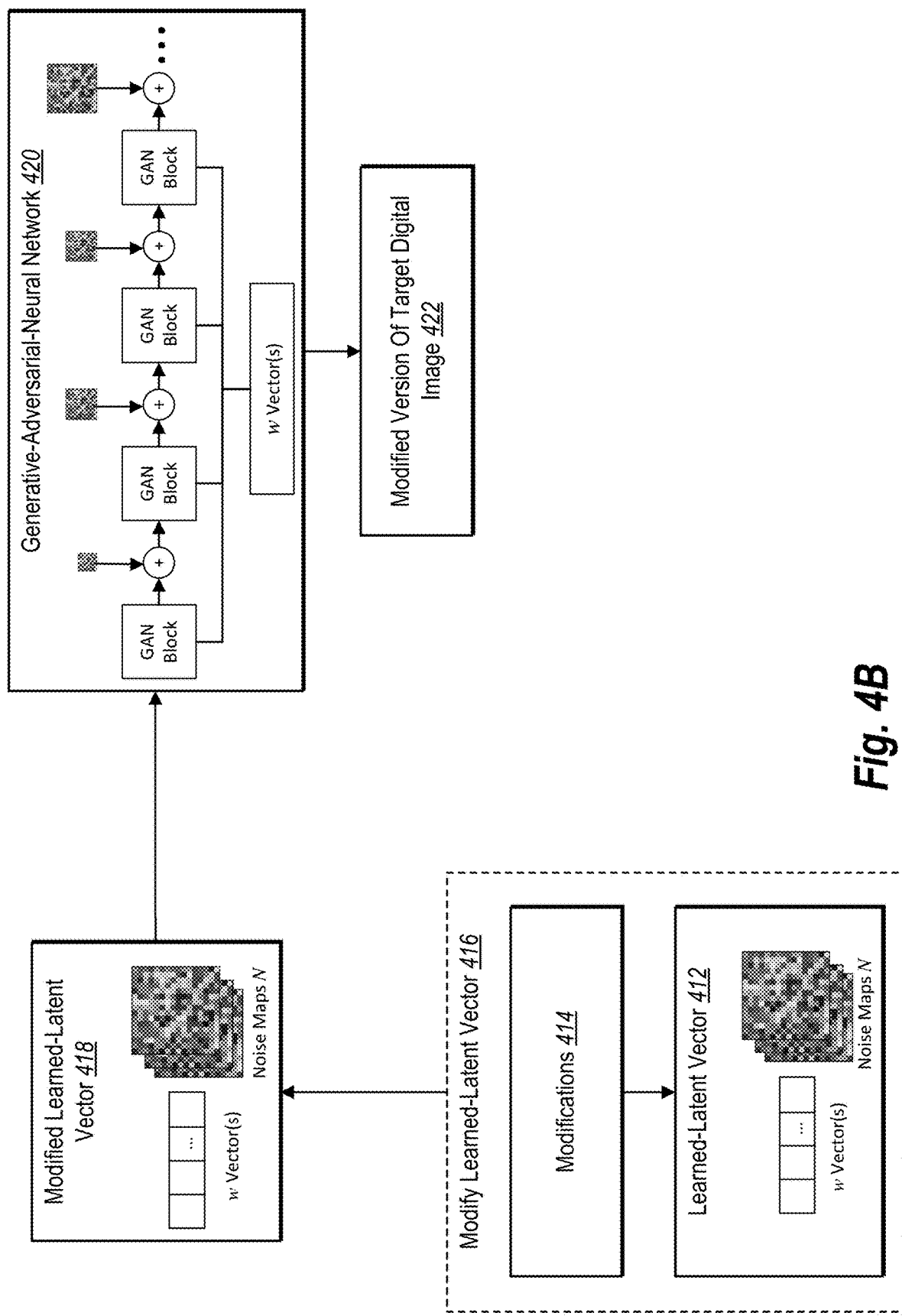
FIG. 4B illustrates an image projection system generating a modified version of a target digital image utilizing a learned-latent vector in accordance with one or more embodiments.

As mentioned above, in some embodiments, the image projection system 106 learns a learned-latent vector for a target digital image utilizing a learned-initialization-latent vector. In certain instances, the image projection system 106 generates a learned-latent vector for a target digital image by using a learned-initialization-latent vector and a GAN. In many cases, as previously mentioned, by utilizing the learned-initialization-latent vector, the image projection system 106 quickly and efficiently learns a learned-latent vector for a target digital image (e.g., in 2-5 seconds). Then, in some embodiments, the image projection system 106 utilizes the learned-latent vector with the GAN to generated modified versions of the target digital image (in response to a request to modify the target digital image). For example, FIG. 4A illustrates the image projection system 106 utilizing a learned-initialization-latent vector to generate a learned-latent vector for a target digital image. FIG. 4B illustrates the image projection system 106 utilizing the learned-latent vector to generate a modified version of the target digital image.

To illustrate, as shown in FIG. 4A, the image projection system 106 iteratively modifies a learned-initialization-latent vector to generate a learned-latent vector for a target digital image. In particular, as shown in FIG. 4A, the image projection system 106 utilizes a learned-initialization-latent vector 402 having a latent-feature vector w and noise maps N (identified or generated as described above) with a generative adversarial neural network 404 to generate a reconstructed digital image 408 (as also described above). Then, as shown in FIG. 4A, the image projection system 106 determines a loss between the reconstructed digital image 408 and a target digital image 410 (e.g., utilizing a loss function as described above).

As further illustrated in FIG. 4A, the image projection system 106 utilizes the loss between the reconstructed digital image 408 and a target digital image 410 as a basis for modifying the learned-initialization-latent vector 402 (as described above). Furthermore, the image projection system 106 iteratively utilizes the modified versions of the learned-initialization-latent vector 402 with the generative adversarial neural network 404 to generate additional versions of the reconstructed digital image 408. Indeed, in some embodiments, the image projection system 106 compares the additional versions of the reconstructed digital image 408 with the target digital image 410 to determine additional losses. In addition, the image projection system 106 utilizes the additional losses to modify additional versions of the learned-initialization-latent vector 402.

As suggested above, in some embodiments, the image projection system 106 continues the learning iterations of modifying the learned-initialization-latent vector 402 based on the target digital image 410 utilizing the generative adversarial neural network 404 until satisfying a stopping condition. For instance, the image projection system 106 iteratively modifies the learned-initialization-latent vector 402 until satisfying a stopping condition by determining a threshold-satisfying loss between a version of the reconstructed digital image 408 and a target digital image 410, modifying the learned-initialization-latent vector 402 for a threshold number of learning iterations, or modifying the learned-initialization-latent vector 402 for a threshold period of time.

By doing so, as shown in FIG. 4A, the image projection system 106 utilizes a modified version of the learnedinitialization-latent vector 402 that satisfies one of the above-mentioned stopping conditions as a learned-latent vector 412 for the target digital image 410. Indeed, in one or more embodiments, the image projection system 106 utilizes the stopping condition to generate a learned-latent vector from a modified version of the learned-initialization-latent vector that the generative adversarial neural network 404 converts into a reconstructed version of the target digital image 410.

As just mentioned, in some instances, the image projection system 106 utilizes a loss-based stopping condition while iteratively modifying the learned-initialization-latent vector 402. In particular, in some embodiments, the image projection system 10 generates, from a particular modified version of the learned-initialization-latent vector 402 utilizing the generative adversarial neural network 404, a reconstructed digital image 408. In addition, in one or more embodiments, the image projection system 106 compares the reconstructed digital image 408 to the target digital image 410 to determine a loss. In certain instances, the image projection system 106 continues to modify the learned-initialization-latent vector 402 until a comparison between a reconstructed digital image 408 and the target digital image 410 results in a loss that satisfies a threshold loss. Indeed, in some instances, the image projection system 106 utilizes a threshold loss that indicates an accurate or high-fidelity match between two digital images (e.g., the two digital images are sufficiently similar or identical and result in a loss that satisfies the threshold loss).

In one or more embodiments, a version of the reconstructed digital image 408 becomes a reconstructed version of the target digital image 410 when the loss between the version of the reconstructed digital image 408 and the target digital image 410 satisfies a threshold loss. In many instances, the image projection system 106 generates a version of the reconstructed digital image 408 that, when compared to the target digital image 410, results in a loss that satisfies a threshold loss quicker (e.g., in less learning iterations and/or time) than utilized to generate the learned-initialization-latent vector 402 (and many conventional image generating systems). Furthermore, in some instances, the image projection system 106 utilizes a threshold loss that is configured by an administrative user of the image projection system 106 (e.g., a user setting, system setting). In some cases, the image projection system 106 learns (or adjusts) a threshold loss using a machine learning approach, automatic calibration based on user feedback on reconstructed images from the learned-latent vectors, or automatic calibration utilizing an accuracy measurement between the target digital image and the reconstructed version of the target digital image.

As further mentioned above, in one or more embodiments, the image projection system 106 utilizes a learning iteration-based stopping condition. In particular, in certain instances, the image projection system 106 iteratively modifies the learned-initialization-latent vector 402 for a threshold number of learning iterations to generate the learned-latent vector 412 for the target digital image 410. For example, within the threshold number of learning iterations, the image projection system 106 generates, from a particular modified version of the learned-initialization-latent vector 402 utilizing the generative adversarial neural network 404, a version of the reconstructed digital image 408 that is a reconstructed version of the target digital image 410.

Moreover, in some embodiments, the threshold number of learning iterations is less than the number of learning iterations utilized to generate the learned-initialization-latent vector 402. As such, the image projection system 106 generates the learned-latent vector 412 with greater speed (and fewer computational resources) than needed to generate the learned-initialization-latent vector 402 (and many conventional image generating systems). Moreover, in some embodiments, the image projection system 106 utilizes a threshold number of iterations that is configured by an administrative user of the image projection system 106 (e.g., a user setting, system setting). In addition, in some embodiments, the image projection system 106 also learns (or adjusts) a threshold number of iterations using a machine learning approach, automatic calibration based on user feedback on reconstructed images from the learned-latent vectors, or automatic calibration utilizing an accuracy measurement between the target digital image and the reconstructed version of the target digital image.

To illustrate (as outlined in the following pseudo-code of Table 1), in some embodiments, the image projection system 106 generates a learned-initialization-latent vector $Z_{INIT}$ from an initialization digital image $I_1$ with a first number of learning iterations $LI_1$ (e.g., 7,500, 9,000, 15,000 learning iterations). Subsequently, as also outlined in the following pseudo-code of Table 1, the image projection system 106 learns learned-latent vectors $Z_i$ for target digital images $I_i$ by utilizing the learned-initialization-latent vector $Z_{INIT}$ with a second number of learning iterations $LI_2$ (e.g., 50, 100, 150 learning iterations) that is less than the first number of learning iterations $LI_1$.

TABLE 1

Input: I = {$I_1, I_2, ... , I_n$}
Output: {$Z_1, Z_2, ... , Z_n$}
$Z_{INIT}$ ← Project($I_1$) for $LI_1$ leaarning iterations;
for i ← 2 to n do
   $Z_i$ ← $Z_{INIT}$;
   $Z_i$ ← Project($I_i$) for $LI_2$ leaarning iterations;
end Additionally, in certain instances, the image projection system 106 utilizes a time-based stopping condition. More specifically, in one or more embodiments, the image projection system 106 iteratively modifies the learned-initialization-latent vector 402 for threshold time period of learning iterations to generate the learned-latent vector 412 of the target digital image 410. For instance, within the threshold time period, the image projection system 106 generates, from a particular modified version of the learned-initialization-latent vector 402 utilizing the generative adversarial neural network 404, a version of the reconstructed digital image 408 that is a reconstructed version of the target digital image 410. In particular, in some embodiments, the image projection system 106 iteratively modifies the learned-initialization-latent vector 402 for a number of learning iterations that can be performed within the threshold time period.

In one or more embodiments, the threshold time period of learning iterations is less than the time period of learning iterations utilized to generate the learned-initialization-latent vector 402. Due to the reduced threshold time period, in certain instances, the image projection system 106 generates the learned-latent vector 412 with greater speed (and fewer computational resources) than needed to generate the learned-initialization-latent vector 402 (and many conventional image generating systems). Furthermore, in one or more embodiments, the image projection system 106 utilizes a threshold time period that is configured by an administrative user of the image projection system 106 and/or learned (or adjusted) by the image projection system 106 (as described above in relation to a threshold learning iteration).

In contrast to many conventional image generating systems that learn a projected latent vector from a randomly initialized latent vector, the image projection system 106 significantly (e.g., by at least one order of magnitude) speeds up the accurate projection of an arbitrary digital image into a latent vector for a GAN by utilizing a learned-initialization-latent vector as a learned prior. For instance, in some instances, the image projection system 106 utilizes the learned-initialization-latent vector to quickly and accurately project an arbitrarily chosen digital image into a different learned-latent vector because the learned-initialization-latent vector of a digital image is closer in space to accurate learned-latent vectors of a wide variety of unique target digital images. Accordingly, in some embodiments, the image projection system 106 iteratively modifies a learned-initialization-latent vector to learn a learned-latent vector for an arbitrarily chosen target digital image in significantly quicker speeds (e.g., 2-5 seconds) than many conventional image generating systems. In some instances, the image projection system 106 projects an arbitrarily chosen target digital image into a learned-latent vector by utilizing a StyleGAN as described by Image2StyleGAN or by Image2StyleGAN++.

In addition, in one or more embodiments, the image projection system 106 utilizes a modified learning rate (e.g., a large learning rate compared to the learning rate described by Image2StyleGAN and/or Image2StyleGAN++) with a singular latent-feature vector w and one or more noise maps N within the GAN to learn a learned-latent vector for a target digital image utilizing a learned-initialization-latent vector (as described above). Furthermore, in some embodiments, the image projection system 106 utilizes a same learning rate across different learning iterations to generate a learned-latent vector for a target digital image from a learned-initialization-latent vector (as described above). For example, the image projection system 106 removes learning rate ramp-ups, removes common learning rate ramp-ups, and/or reduces linearly annealing learning rate ramp-down periods while learning a learned-latent vector for a target digital (using the learned-initialization-latent vector).

As mentioned above, FIG. 4B illustrates the image projection system 106 utilizing the learned-latent vector to generate a modified version of the target digital image utilizing a GAN. For example, as shown in FIG. 4B, the image projection system 106 receives modifications 414 (e.g., from a client device) for the target digital image 410 (from FIG. 4A). Then, as shown in act 416 of FIG. 4B, the image projection system 106 modifies the learned-latent vector 412 (e.g., from FIG. 4A) based on the modifications 414 corresponding to the target digital image 410 to generate a modified learned-latent vector 418. As illustrated in FIG. 4B, the image projection system 106 then inputs the modified learned-latent vector 418 into the generative adversarial neural network 420 to generate a modified version of the target digital image 422.

In certain instances, the image projection system 106 modifies a learned-latent vector by modifying at least one latent-feature vector and/or at least one noise map corresponding to the learned-latent vector. For example, the image projection system 106 modifies values (e.g., activation values and/or activation tensor values) corresponding to one or more latent-feature vectors that control object attributes (e.g., face structure, object color, makeup style, eye color, hair style, hair color) and/or characteristics (e.g., lighting, stylistic properties) of a digital image. In addition, the image projection system 106 modifies one or more noise maps that control details within a resulting digital image (e.g., hair style detail, facial feature details, object shape detail). By modifying at least one latent-feature vector and/or at least one noise map corresponding to the learned-latent vector of a target digital image, the image projection system 106 changes the resulting attributes and/or characteristics depicted within a modified version of the target digital image that a GAN outputs from the modified learned-latent vector.

For example, the image projection system 106 modifies the learned-latent vector of the target digital image to copy or blend attributes (e.g., via masking) of an additional digital image (using an additional learned-latent vector of the additional digital image) into a modified version of the target digital image as described by Image2StyleGAN++. Moreover, in some embodiments, the image projection system 106 modifies the learned-latent vector to perform inpainting of the target digital image, perform local semantic edits of a target digital image, and/or style transfers for the target digital image as described by Image2StyleGAN++.

Furthermore, in some embodiments, the image projection system 106 modifies the learned-latent vector of the target digital image utilizing a learned-latent vector of an additional digital image to transfer hairstyles between the digital images as described in U.S. patent application Ser. No. 17/034,845, entitled Transferring Hairstyles Between Portrait Images Utilizing Deep Latent Representations assigned to Adobe Inc., and hereby incorporated by reference in its entirety. Furthermore, in certain instances, the image projection system 106 modifies the learned-latent vector of the target digital image to alter illumination and/or lighting conditions (e.g., illumination under an environmental light of where the image was captured), image saturation, image brightness, image contrast, image black points, image white balance, and/or image tone within the modified version of the target digital image.

Moreover, in one or more embodiments, the image projection system 106 generates a modified version of a learned-latent vector by combining the learned-latent vector with an additional learned-latent vector that corresponds to an additional digital image. Then, in certain instances, the image projection system 106 generates a modified version of the target digital image (as a blended image of the target digital image and the additional digital image) by utilizing an image-generating-neural network with the modified version of a learned-latent vector.

Additionally, in some instances, the image projection system 106 modifies a learned-latent vector of the target digital image by smoothly interpolating between the learned-latent vector and an additional learned-latent vector (of an additional digital image). For example, by interpolating between the two learned-latent vectors, the image projection system 106 generates a modified learned-latent vector that, when processed by an image-generating-neural network, converts into a blended digital image that depicts a blend between the target digital image and the additional digital image. In certain instances, the image projection system 106 modifies the learned-latent vector of the target digital image to modify (or transfer) the gender, age, and/or skin color of a person depicted within a modified version of the target digital image.

Furthermore, in certain instances, the image projection system 106 utilizes a learned-latent vector with an image-generating-neural network to identify which portions (e.g., layers) of the learned-latent vector control which attributes of a target digital image. For instance, the image projection system 106 inverts portions of a learned-latent vector of a target digital image prior to utilizing the learned-latent vector with an image-generating-neural network to identify changes in attributes of the resulting reconstructed version of the target digital image. For example, the image projection system 106 identifies specific portions of the learned-latent vector that control attributes, such as lighting, color, background details, foreground details, and/or textures. Upon identifying the specific portion of the learned-latent vector, the image projection system 106 modifies the specific portion to modify the particular attribute (e.g., lighting, color, background details, foreground details, and/or textures) within a modified version of the target digital image. Additionally, in some instances, the image projection system 106 can utilize the identified portions of the learned-latent vector to reduce or prune the learned-latent vector (e.g., to compress the learned-latent vector) while maintaining significant details of a target digital image corresponding to the learned-latent vector.

In one or more embodiments, the image projection system 106 modifies a target digital image by modifying a learned-initialization-latent vector such that the learned-initialization-latent vector, when processed by an image-generating-neural network, converts into the modified version of the target digital image. In particular, in some cases, the image projection system 106 modifies a learned-initialization-latent vector directly to generate a modified version of the learned-initialization-latent vector that converts to a modified version of the target digital image. For instance, the image projection system 106 utilizes a single-step image modification approach by identifying a learned-initialization-latent vector (as described above) and then modifying the learned-initialization-latent vector using modification approaches such as, but not limited to, interpolation between latent vectors and/or modification of latent vectors (as described above). For example, the image projection system 106 utilizes the single-step image modification approach to generate a modified version of the learned-initialization-latent vector that converts into a modified version of the target digital image.

For example, the image projection system 106 identifies a learned-initialization-latent vector that includes a desired modification attribute (e.g., a stylistic property and/or other property). Then, in one or more embodiments, the image projection system 106 modifies the learned-initialization-latent vector to learn features of a target digital image (e.g., select features of a depicted object) while maintaining the desired modification attributes within the learned-initialization-latent vector. Indeed, in some instances, the image projection system 106 modifies a learned-initialization-latent vector to generate a modified version of a target digital image with an image-generating-neural network (e.g., with various components) and/or without an image-generating-neural network.

To illustrate, in some embodiments, the image projection system 106 utilizes a learned-initialization-latent vector to perform style transfer (e.g., incorporate a stylistic property within a target digital image, such as monochrome style, various filter styles, a painting style). For example, the image projection system 106 identifies a learned-initialization-latent vector that corresponds to a digital image that has a particular stylistic property (e.g., a Van-Gough and/or Monet-like paint style within the digital image). Then, in one or more embodiments, the image projection system 106 modifies the learned-initialization-latent vector until the learned-initialization-latent vector converts into a modified version of the target digital image that depicts its subject matter with the style transfer stylistic property (e.g., the Van-Gough and/or Monet-like paint style within the modified version of the target digital image) with improved speeds.

Figure 5:
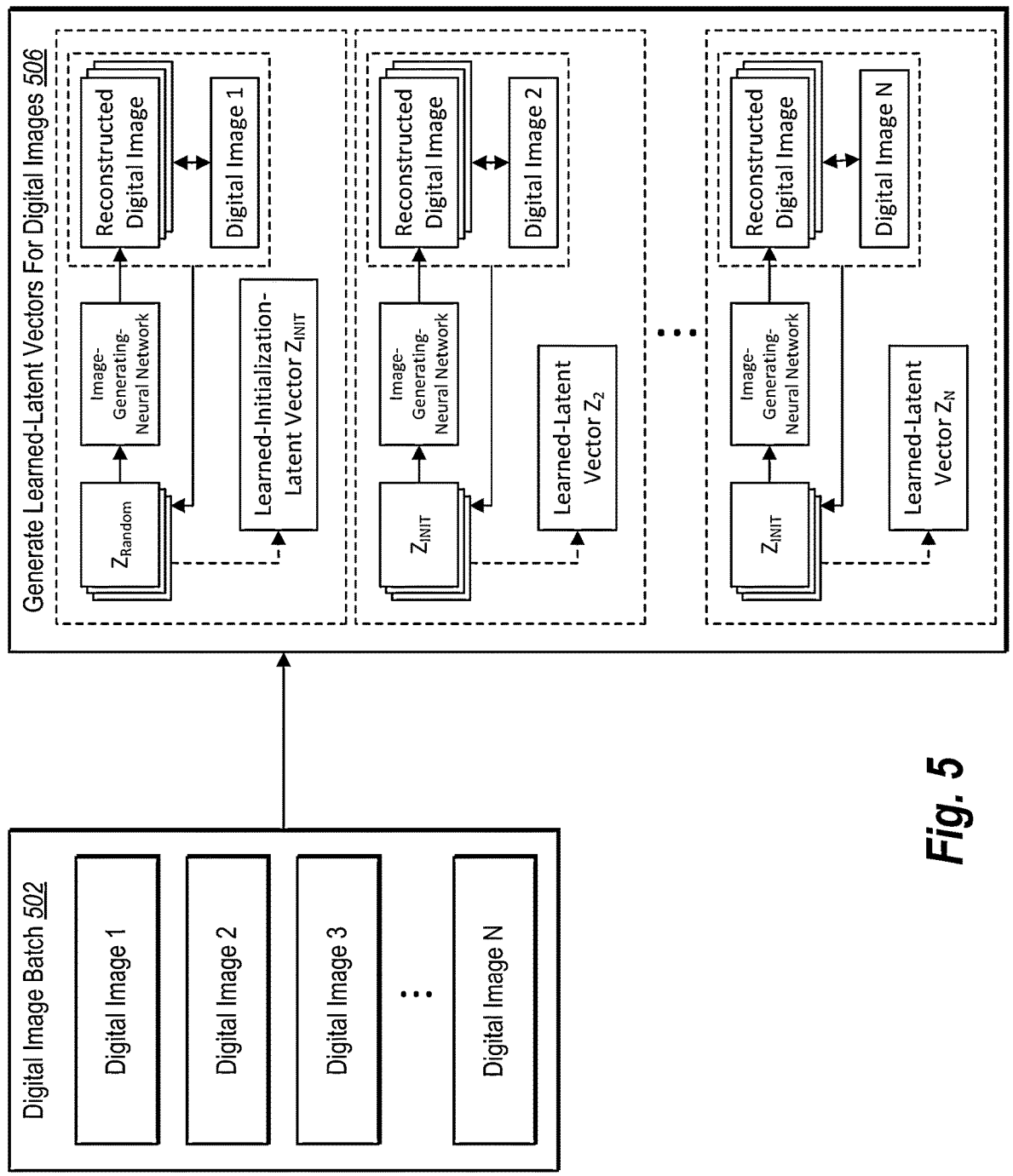
FIG. 5 illustrates an image projection system generating learned-latent vectors for a batch of digital images in accordance with one or more embodiments.

As mentioned above, in one or more embodiments, the image projection system 106 quickly and efficiently projects a batch of digital images into learned-latent vectors (e.g., for modification of the digital images) by utilizing a learned-initialization-latent vector. For example, FIG. 5 illustrates the image projection system 106 utilizing a learned-initialization-latent vector to project a batch of digital images (i.e., multiple target digital images) into learned-latent vectors. Indeed, in one or more embodiments, the image projection system 106 generates learned-latent vectors that, when processed by an image-generating-neural network, convert into accurate reconstructed versions of the respective digital images from the batch of digital images. In some embodiments, by utilizing a learned-initialization-latent vector, the image projection system 106 projects a batch of digital images into learned-latent vectors with improved speeds and with less computational resources (e.g., 2-5 seconds per digital image) as previously mentioned.

As shown in FIG. 5, the image projection system 106 identifies a digital image batch 502 (e.g., having digital image 1 through digital image N). Then, as illustrated in act 506 of FIG. 5, the image projection system 106 generates a learned-initialization-latent vector $Z_{INIT}$ learned from a first digital image (e.g., digital image 1) and a randomly initialized latent vector $Z_{Random}$ (in accordance with one or more embodiments herein). Moreover, as shown in the act 506 of FIG. 5, the image projection system 106 utilizes the learned-initialization-latent vector $Z_{INIT}$ to generate learned-latent vectors for the subsequent digital images in the digital image batch 502.

In particular, as shown in the act 506 of FIG. 5 for digital image 2, the image projection system 106 iteratively modifies the learned-initialization-latent vector $Z_{INIT}$ until a resulting reconstructed digital image (from an image-generating-neural network) is a reconstructed version of the digital image 2 (e.g., until a stopping condition is satisfied as described above). As further shown in the act 506 of FIG. 5, the image projection system 106 generates a learned-latent vector $Z_2$ for the digital image 2 upon satisfying the above-mentioned stopping condition. Likewise, as illustrated in the act 506 of FIG. 5, the image projection system 106 also utilizes the learned-initialization-latent vector $Z_{INIT}$ to generate learned-latent vectors that, when processed by an image-generating-neural network, convert into reconstructed versions of each of the remaining digital images from the digital image batch 502 (e.g., a learned-latent vector $Z_N$ for digital image N). Indeed, in one or more embodiments, the image projection system 106 generates learned-latent vector $Z_2$ through learned-latent vector $Z_N$ for digital images 2 to N from the digital image batch 502 by utilizing the learned-initialization-latent vector $Z_{INIT}$ as a learned prior (e.g., the initial latent vector in each of the projection of digital images 2 to N).

Although FIG. 5 illustrates the image projection system 106 generating a learned-initialization-latent vector $Z_{INIT}$ from a first digital image (e.g., digital image 1) from the digital image batch 502, in some instances, the image projection system 106 utilizes another digital image (e.g., randomly selected, user selected) from the digital image batch 502 to generate the learned-initialization-latent vector $Z_{INIT}$. Moreover, although FIG. 5 illustrates the image projection system 106 generating a learned-initialization-latent vector from the digital image batch 502, in some instances, the image projection system 106 utilizes a previously learned learned-initialization-latent vector (e.g., a selection of a stored learned-initialization-latent vector as described above) to generate learned-latent vectors for digital images in the digital image batch 502. More specifically, in one or more embodiments, the image projection system 106 selects a stored learned-initialization-latent vector and utilizes the learned-initialization-latent vector to generate learned-latent vectors for digital image 1 through digital image N from the digital image batch 502.

Upon generating learned-latent vectors for a batch of digital images, in one or more embodiments, the image projection system 106 utilizes the learned-latent vectors to generate modified versions of digital images from the batch of digital images based on various requested modifications. Indeed, in certain instances, the image projection system 106 generates modified versions for various combinations of the batch of digital images using corresponding learned-latent vectors as described above. Furthermore, in one or more embodiments, the image projection system 106 directly modifies a learned-initialization-latent vector utilizing a target digital image from the batch of digital images to generate a modified version of the learned-initialization-latent vector that converts into a modified version of the target digital image.

In some embodiments, the image projection system 106 utilizes the learned-latent vectors generated for the batch of digital images to make the digital images searchable. For example, the image projection system 106 utilizes a learned-latent vector corresponding to a digital image to search for other digital images that correspond to similar learned-latent vectors (e.g., based on a distance between the learned-latent vectors). Furthermore, in one or more embodiments, the image projection system 106 generates the learned-latent vectors for the batch of digital images to store the learned-latent vectors for later modification of the digital images. For instance, the image projection system 106 precomputes the learned-latent vectors for storage in a cloud-based service to enable modification of the digital images with improved speeds at the time of a user request to modify the digital images.

As suggested above, the image projection system 106 can also learn latent vectors for frames in a digital video. In one or more embodiments, the image projection system 106 projects a digital video into a one or more latent vectors within a latent-noise space for an image-generating-neural network utilizing a learned-initialization-latent vector. For instance, the image projection system 106 utilizes digital video frames of a digital video as a batch of digital images. Then, in one or more embodiments, the image projection system 106 generates learned-latent vectors for each digital image in the batch of digital images utilizing a learned-initialization-latent vector (as described above). As an example, the image projection system 106 generates a learned-initialization-latent vector for a first digital video frame (e.g., a first digital image in the batch of digital images) and utilizes the learned-initialization-latent vector to project subsequent digital video frames into learned-latent vectors (as described above). Moreover, in certain instances, the image projection system 106 modifies the learned-latent vectors corresponding to the digital video frames (of the digital video) to generate a modified version of the digital video using an image-generating-neural network (as described above) to modify at least a portion of the digital video.

Figure 6:
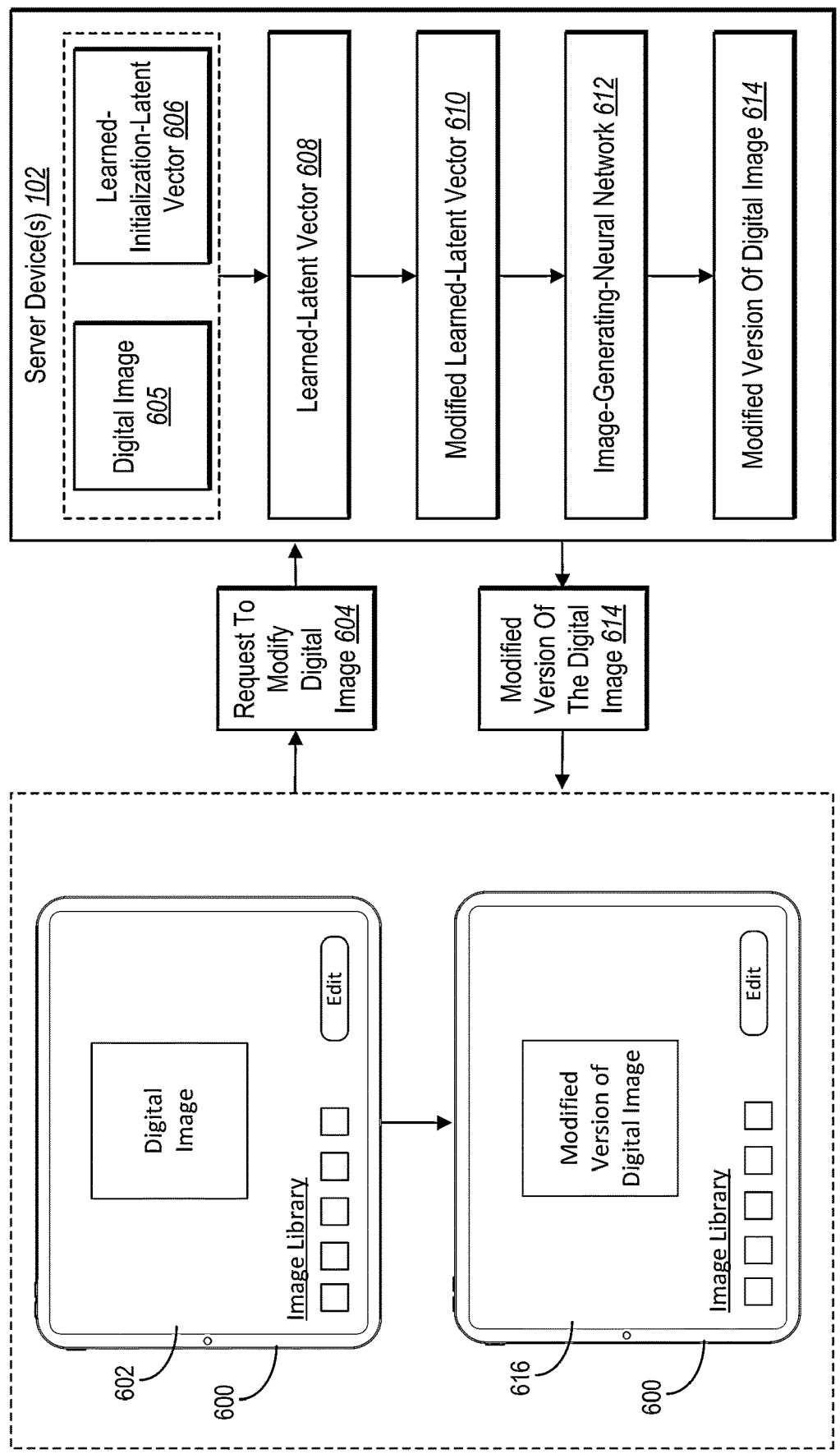
FIG. 6 illustrates an image projection system generating a modified version of a target digital image in response to a modification request in accordance with one or more embodiments.

As previously mentioned, in some embodiments, the image projection system 106 receives a request to modify a target digital image and generates a modified version of the target digital image utilizing a learned-latent vector of the target digital image. For instance, FIG. 6 illustrates the image projection system 106 receiving a request to modify a target digital image and generating a modified version of the target digital image in accordance with one or more embodiments herein. Indeed, FIG. 6 illustrates the image projection system 106 utilizing digital images from a client device to generate modified versions of the digital images on a server prior to providing the modified versions of the digital images on the client device.

For example, as shown in FIG. 6, the image projection system 106 receives a request to modify a digital image 604 displayed on a graphical user interface 602 of a client device 600 (e.g., operating a digital graphics application). Within the server device(s) 102, the image projection system 106 utilizes the digital image 605 from the request to modify the digital image 604 and a learned-initialization-latent vector 606 to generate a learned-latent vector 608 (as described above). Indeed, in some instances, the image projection system 106 identifies a learned-initialization-latent vector 606 to utilize from a stored learned-initialization-latent vector (as described above) and/or a learned-initialization-latent vector generated from a digital image corresponding to the client device 600.

Subsequently, as shown in FIG. 6, the image projection system 106 modifies the learned-latent vector 608 based on the requested modifications to generate a modified learned-latent vector 610 (as described above). As further illustrated in FIG. 6, the image projection system 106 then inputs the modified learned-latent vector 610 into an image-generating-neural network 612 to generate a modified version of the digital image 614 (as described above). As shown in FIG. 6, the image projection system 106 provides the modified version of the digital image 614 for display on a graphical user interface 616 of the client device 600.

As mentioned above, the image projection system 106 quickly and efficiently projects digital images into learned latent vectors, that when processed by an image-generating-neural network, convert into high fidelity and high-quality reconstructions of the digital images. For example, experimenters utilized learned-latent vectors in accordance with one or more embodiments to compare results with a conventional projected latent vector (e.g., $W^+N$ projections as described by *Image2StyleGAN++*). In particular, the experimenters projected digital images from various image datasets (e.g., Scenes, ImageNet-M, CelebA-S dataset, LSUN-S dataset, and Cityscapes-S dataset) into learned-latent vectors (in accordance with one or more embodiments) and into conventional projected latent vectors (e.g., $W^+N$ projections as described by *Image2StyleGAN++*). Then, the learned-latent vectors and conventional projected latent vectors were utilized to generate reconstructed images. For example, the following Table 2 demonstrates image quality assessments of the reconstructed images utilizing peak signal-to-noise ratio measurements (PSNR), similarity index measure (SSIM), AlexNet-based learned perceptual image patch similarity metrics (LPIPS), and VGG-based LPIPS.

As shown in Table 2, the reconstructed images from the learned-latent vectors of the image projection system 106 outperforms or achieves comparable results to the reconstructed images from conventional projected latent vectors (e.g., the $W^+N$ projections) across each image dataset. At the same time, the learned-latent vectors the image projection system 106 are also at least an order of magnitude faster to generate compared to the conventional projected latent vectors (e.g., the $W^+N$ projections).

TABLE 2

| | W+ N Latent Vectors | | | | Learned-Latent Vectors | | | |
| --- | --- | --- | --- | --- | --- | --- | --- | --- |
| | PSNR | SSIM | AlexNet LPIPS | VGG LPIPS | PSNR | SSIM | AlexNet LPIPS | VGG LPIPS |
| Scenes | 28.367 | 0.8785 | 0.1714 | 0.2165 | 29.971 | 0.8098 | 0.1353 | 0.2292 |
| ImageNet-M | 21.182 | 0.5887 | 0.1806 | 0.1296 | 26.167 | 0.8655 | 0.1281 | 0.2434 |
| CelebA-S | 26.287 | 0.8463 | 0.0655 | 0.0611 | 34.428 | 0.9419 | 0.0129 | 0.0675 |
| LSUN-S | 19.319 | 0.5426 | 0.3175 | 0.2367 | 32.776 | 0.9014 | 0.0604 | 0.1461 |
| Cityscapes-S | 23.026 | 0.8129 | 0.4001 | 0.2510 | 37.851 | 0.9075 | 0.0489 | 0.2446 |

Figure 7B:
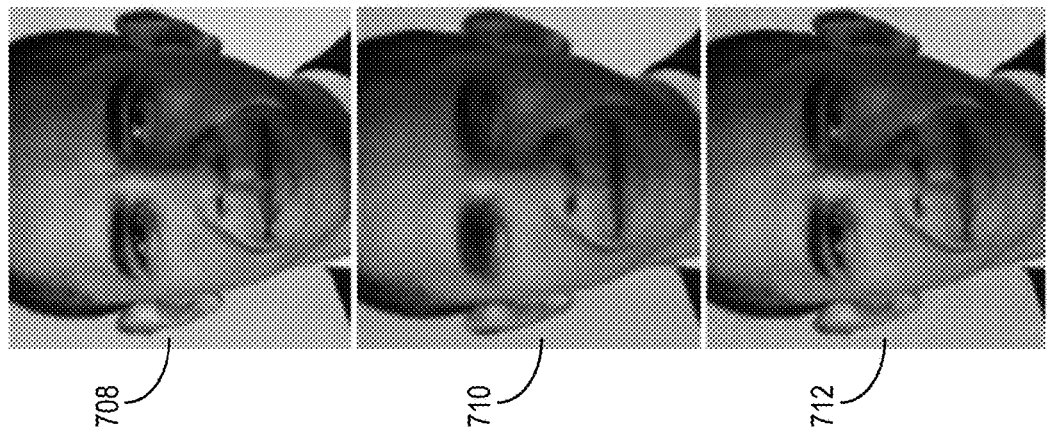
FIGS. 7A-7C and 8 illustrate experimental results of an image projection system in accordance with one or more embodiments.
Figure 7A:
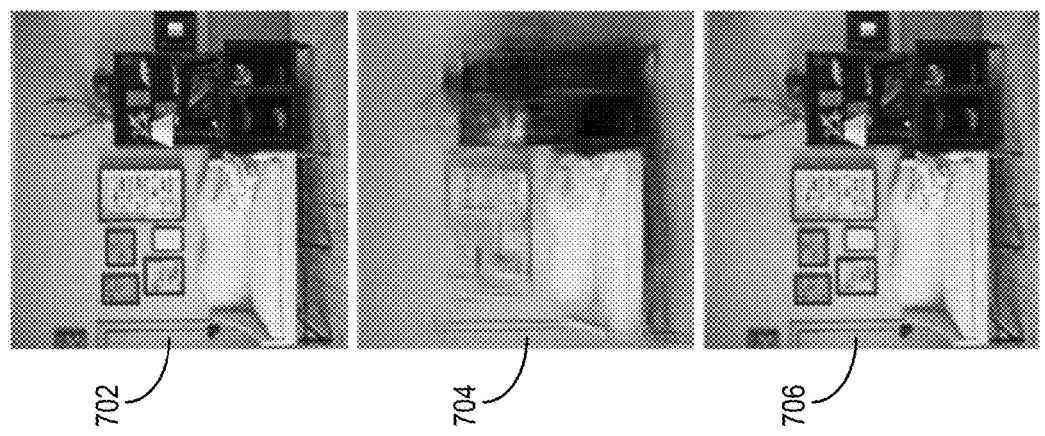

As an example, FIGS. 7A and 7B illustrates reconstructed digital images from projections of digital images into learned-latent vectors (in accordance with one or more embodiments) and into conventional projected latent vectors (e.g., $W^+N$ projections as described by *Image2StyleGAN++*). For instance, FIG. 7A illustrates a reconstructed digital image 704 from a conventional projected latent vector projected from an original digital image 702 and a reconstructed digital image 706 from a learned-latent vector projected by the image projection system 106 (from the original digital image 702). Indeed, as shown in FIG. 7A, the reconstructed digital image 706 (from the learned-latent vector that is projected by the image projection system 106) has a higher fidelity in comparison to the reconstructed digital image 704 (from the conventional projected latent vector) even though the learned latent vector was quicker to learn (e.g., 4-6 minutes per image for the conventional projected latent vectors versus 2-4 seconds per image for the learned-latent vectors).

Additionally, FIG. 7B illustrates a reconstructed digital image 710 from a conventional projected latent vector projected from an original digital image 708 and a reconstructed digital image 712 from a learned-latent vector projected by the image projection system 106 (from the original digital image 708). As shown in FIG. 7B, the reconstructed digital image 712 (from the learned-latent vector that is projected by the image projection system 106) also has a higher fidelity in comparison to the reconstructed digital image 710 (from the conventional projected latent vector). Indeed, in one or more embodiments, the image projection system 106 generates learned-latent vectors that result in reconstructed digital images that capture color and low-level content details, accurately reproduces edge and objects of the original digital images, avoids blurring eyes and other face details in digital images, and also captures shapes and large amounts of details to result in high quality images that maintain details of an image (e.g., objects in the backgrounds).

Figure 7C:
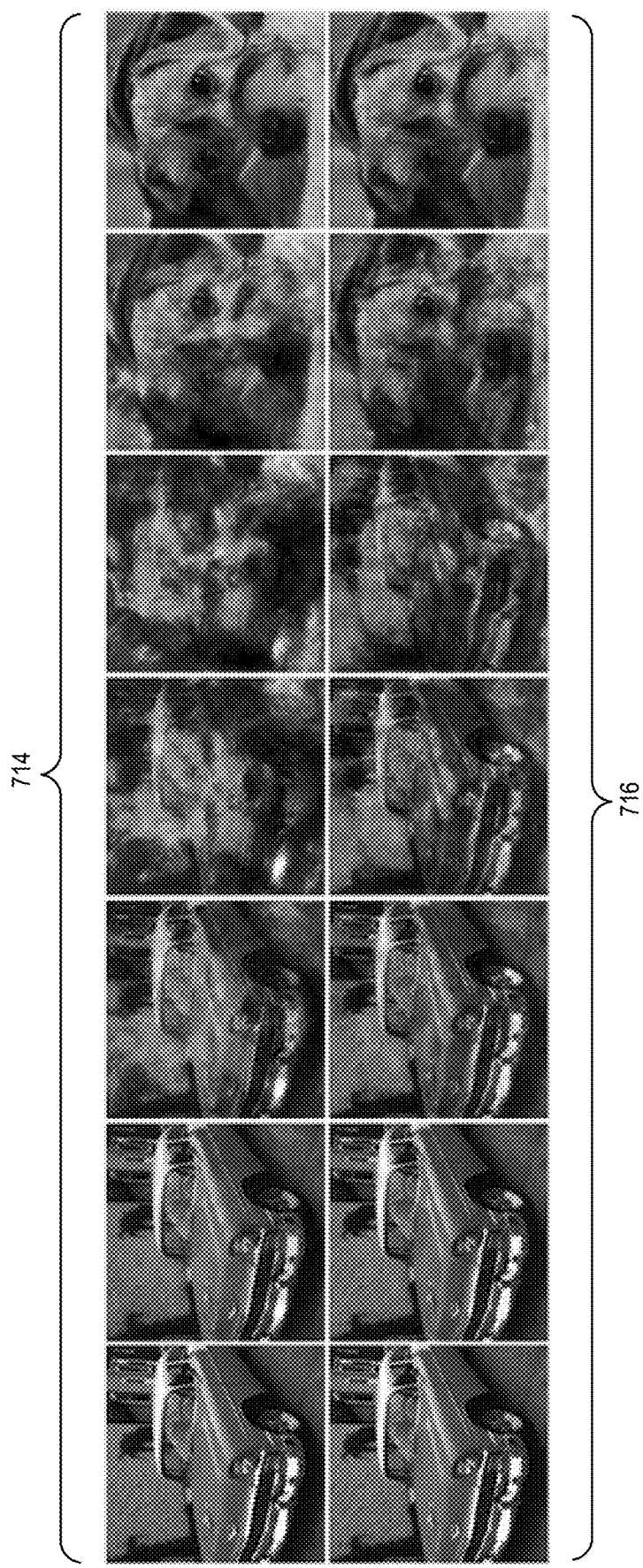

In addition, during interpolation between conventional latent-noise projections (e.g., $W^+N$ projections as described by *Image2StyleGAN++*), the interpolations produce phantom artifacts (e.g., phantom faces) from an image-generating-neural network (e.g., due to biases toward generating specific types of outputs). However, unlike conventional image generating systems, in one or more embodiments, the image projection system 106 generates learned-latent vector projections that avoid phantom artifacts during interpolation between the learned-latent vector projections. For instance, FIG. 7C illustrates interpolations of conventional latent-noise vector projections 714 and interpolations of learned-latent vector projections 716 from the image projection system 106. As shown in FIG. 7C, the interpolations of the learned-latent vector projections 716 avoid phantom artifacts and are smoother unlike the interpolations of conventional latent-noise vector projections 714.

As also mentioned above, the image projection system 106, in certain instances, quickly generates learned-latent vectors (e.g., in 2-5 seconds) that result in digital image reconstructions that have high fidelity and are of high quality. Indeed, FIG. 8 also illustrates reconstructed digital images from learned-latent vectors (in accordance with one or more embodiments) and conventional projected latent vectors (e.g., $W^+N$ projections as described by *Image2StyleGAN++*). For instance, FIG. 8 illustrates conventional-projection-based image reconstructions 802 from conventional projected latent vectors (e.g., $W^+N$ projections) that utilized approximately 20 minutes per digital image during projection.

Figure 8:
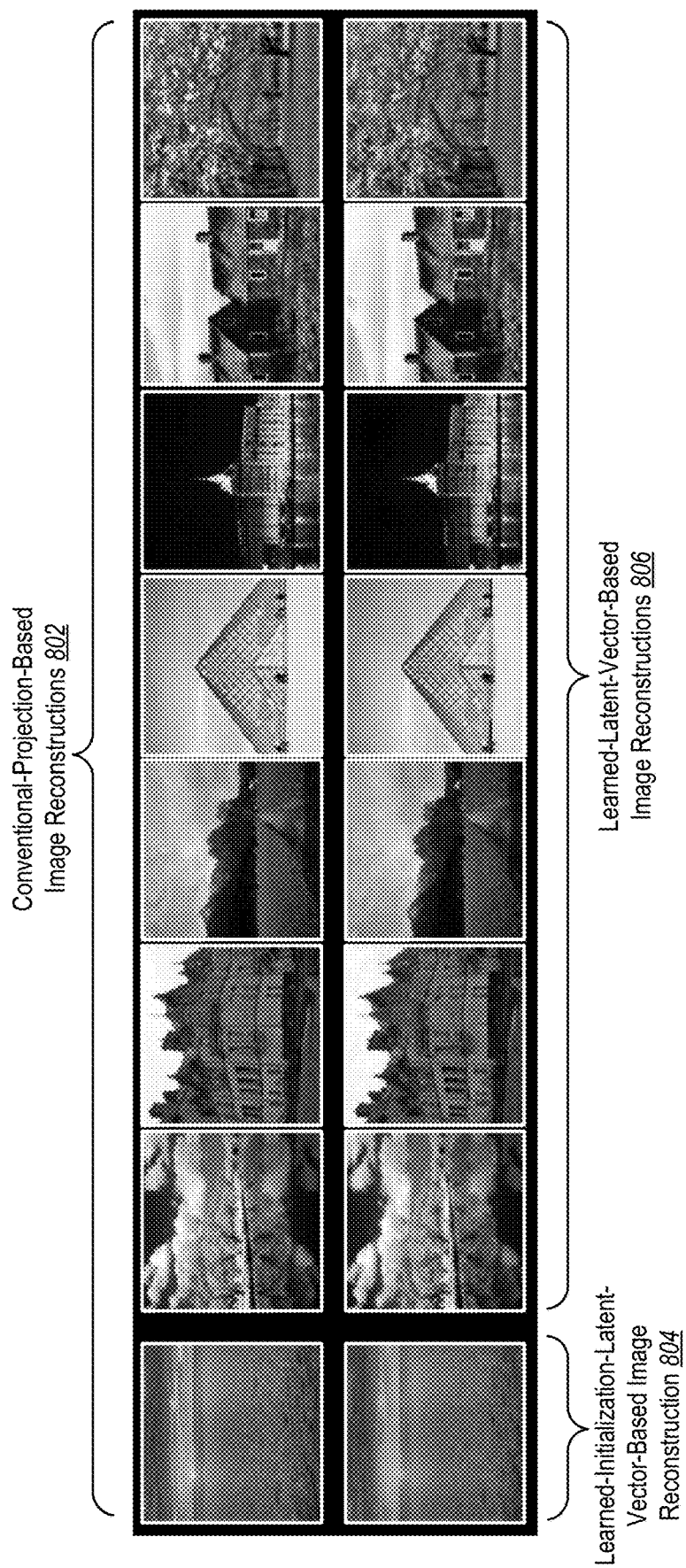

Additionally, FIG. 8 also illustrates learned-latent-vector-based image reconstructions 806 from learned-latent vectors that were generated by the image projection system 106 using a learned-initialization-latent vector corresponding to the learned-initialization-latent-vector-based image reconstruction 804. Indeed, the learned-latent-vector-based image reconstructions 806 are from learned-latent vectors that utilized approximately 2 seconds per digital image during projection (in accordance with one or more embodiments). As demonstrated by FIG. 8, the image projection system 106, in many instances, generates learned-latent vectors (e.g., in 2-5 seconds) that result in digital image reconstructions that have a fidelity and quality that is comparable or outperforms digital image reconstructions from time consuming conventional projected latent vectors.

Figure 9:
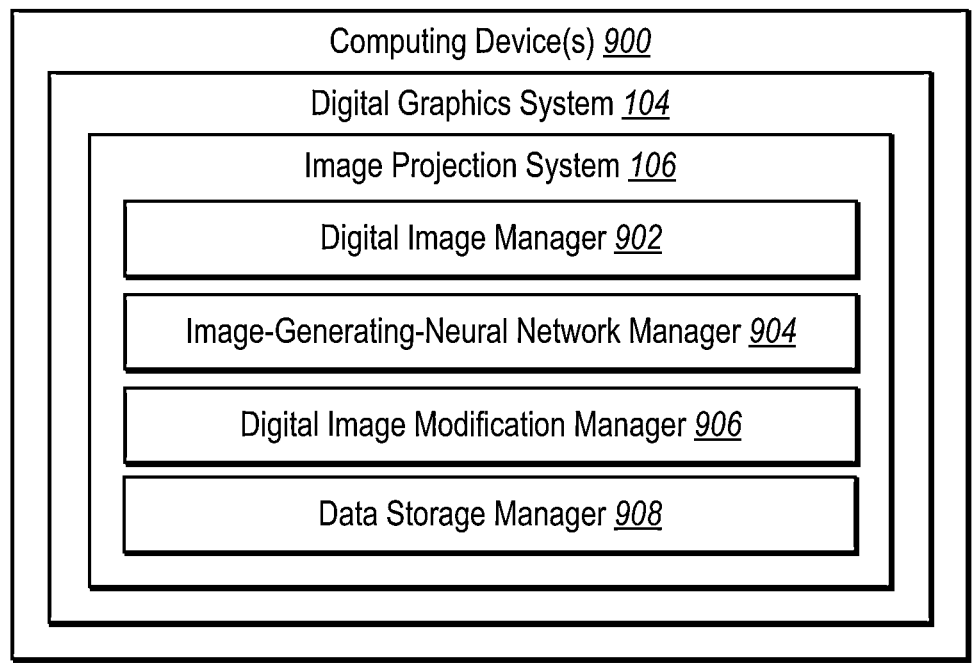
FIG. 9 illustrates a schematic diagram of an image projection system in accordance with one or more embodiments.

Turning now to FIG. 9, additional detail will be provided regarding components and capabilities of one or more embodiments of the image projection system. In particular, FIG. 9 illustrates an example image projection system 106 executed by a computing device 900 (e.g., the server device(s) 102 or the client device 110). As shown by the embodiment of FIG. 9, the computing device 900 includes or hosts the digital graphics system 104 and the image projection system 106. Furthermore, as shown in FIG. 9, the image projection system 106 includes a digital image manager 902, an image-generating-neural network manager 904, a digital image modification manager 906, and a data storage manager 908.

As just mentioned, and as illustrated in the embodiment of FIG. 9, the image projection system 106 includes the digital image manager 902. For instance, the digital image manager 902 identifies, stores, transmits, and/or displays digital images (and/or digital videos) as described above (e.g., in relation to FIGS. 1, 2, 5, and 6). In some instances, the digital image manager 902 stores digital images with corresponding learned-initialization-latent vectors and/or learned-latent vectors (generated in accordance with one or more embodiments) as described above (e.g., in relation to FIGS. 1, 2, 5, and 6).

Furthermore, as shown in FIG. 9, the image projection system 106 includes the image-generating-neural network manager 904. For example, the image-generating-neural network manager 904 identifies and/or generates learned-initialization-latent vectors from initialization digital images as described above (e.g., in relation to FIGS. 2 and 3). Additionally, in one or more embodiments, the image-generating-neural network manager 904 generates learned-latent vectors for target digital images by iteratively modifying a learned-initialization-latent vector as described above (e.g., in relation to FIGS. 4A, 4B, and 5). Moreover, in one or more embodiments, the image-generating-neural network manager 904 utilizes an image-generating-neural network to convert a learned-initialization-latent vector and/or learned-latent vector into a reconstructed version of a digital image as described above (e.g., in relation to FIGS. 2-6).

In addition, as shown in FIG. 9, the image projection system 106 includes the digital image modification manager 906. For instance, the digital image modification manager 906 modifies a learned-initialization-latent vector and/or a learned-latent vector that, when utilized with an image-generating-neural network, converts into a modified version of a digital image as described above (e.g., in relation to FIGS. 4B and 6). As also shown in FIG. 9, the image projection system 106 includes the data storage manager 908. In some embodiments, the data storage manager 908 is implemented by one or more memory devices. Additionally, in certain instances, the data storage manager 908 maintains data to perform one or more functions of the image projection system 106. For example, the data storage manager 908 includes digital images, latent vectors (e.g., learned-initialization-latent vectors and/or learned-latent vectors), and/or image-generating-neural network components (e.g., neural network parameters, neural network channel weights, GAN data, GAN parameters).

Each of the components 902-908 of the computing device 900 (e.g., the computing device 900 implementing the image projection system 106), as shown in FIG. 9, may be in communication with one another using any suitable technology. The components 902-908 of the computing device 900 can comprise software, hardware, or both. For example, the components 902-908 can comprise one or more instructions stored on a computer-readable storage medium and executable by processor of one or more computing devices. When executed by the one or more processors, the computer-executable instructions of the image projection system 106 (e.g., via the computing device 900) can cause a client device and/or server device to perform the methods described herein. Alternatively, the components 902-908 and their corresponding elements can comprise hardware, such as a special purpose processing device to perform a certain function or group of functions. Additionally, the components 902-908 can comprise a combination of computer-executable instructions and hardware.

Furthermore, the components 902-908 of the image projection system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 902-908 may be implemented as a stand-alone application, such as a desktop or mobile application. Furthermore, the components 902-908 may be implemented as one or more web-based applications hosted on a remote server. The components 902-908 may also be implemented in a suite of mobile device applications or "apps." To illustrate, the components 902-908 may be implemented in an application, including but not limited to, ADOBE PHOTOSHOP, ADOBE PREMIERE, ADOBE LIGHTROOM, ADOBE ILLUSTRATOR, or ADOBE SUBSTANCE. "ADOBE," "ADOBE PHOTOSHOP," "ADOBE PREMIERE," "ADOBE LIGHTROOM," "ADOBE ILLUSTRATOR," or "ADOBE SUBSTANCE" are either registered trademarks or trademarks of Adobe Inc. in the United States and/or other countries.

Figure 10:
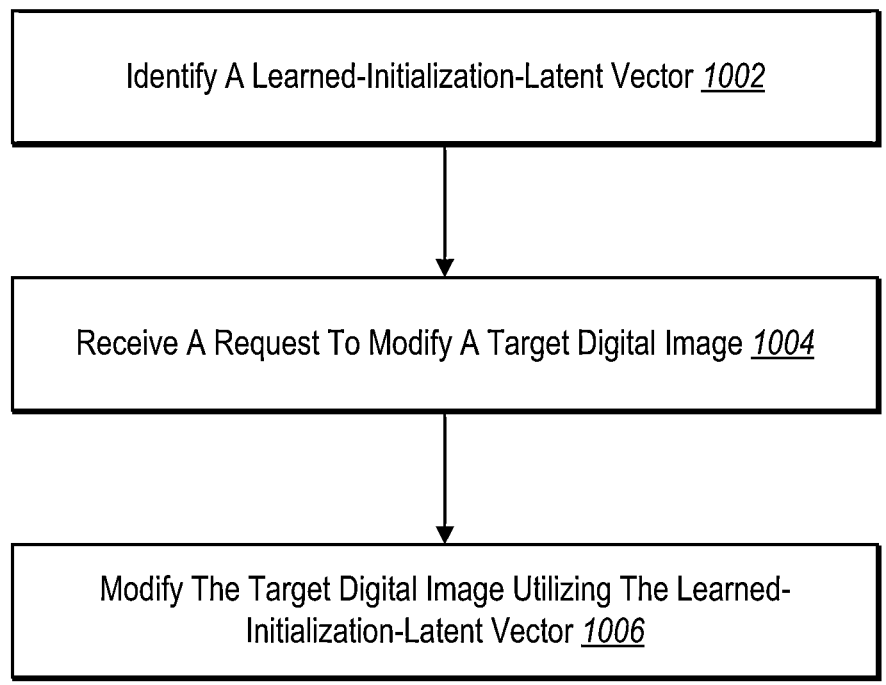
FIG. 10 illustrates a flowchart of a series of acts for modifying a target digital image utilizing a learned-initialization-latent vector in accordance with one or more embodiments.

FIGS. 1-9, the corresponding text, and the examples provide a number of different methods, systems, devices, and non-transitory computer-readable media of the image projection system 106. In addition to the foregoing, one or more embodiments can also be described in terms of flowcharts comprising acts for accomplishing a particular result, as shown in FIG. 10. The acts shown in FIG. 10 may be performed in connection with more or fewer acts. Further, the acts may be performed in differing orders. Additionally, the acts described herein may be repeated or performed in parallel with one another or parallel with different instances of the same or similar acts. A non-transitory computer-readable medium can comprise instructions that, when executed by one or more processors, cause a computing device to perform the acts of FIG. 10. In some embodiments, a system can be configured to perform the acts of FIG. 10. Alternatively, the acts of FIG. 10 can be performed as part of a computer-implemented method.

As mentioned above, FIG. 10 illustrates a flowchart of a series of acts 1000 for modifying a target digital image utilizing a learned-initialization-latent vector in accordance with one or more embodiments. While FIG. 10 illustrates acts according to one embodiment, alternative embodiments may omit, add to, reorder, and/or modify any of the acts shown in FIG. 10.

As shown in FIG. 10, the series of acts 1000 include an act 1002 of identifying a learned-initialization-latent vector. In particular, in one or more embodiments, the act 1002 includes identifying a learned-initialization-latent vector learned from a first digital image utilizing an image-generating-neural network. For example, a learned-initialization-latent vector includes at least one latent feature vector and multiple noise maps. In some instances, a learned-initialization-latent vector includes a concatenation of at least one latent feature vector and multiple random noise maps. Furthermore, in some embodiments, an image-generating-neural network includes a generative-adversarial-neural network (GAN). In certain instances, the act 1002 includes identifying a learned-initialization-latent vector by identifying a latent vector that, when processed by an image-generating-neural network, converts into a reconstructed version of a first digital image.

In some embodiments, the act 1002 includes identifying a learned-initialization-latent vector by iteratively modifying a latent vector for a first number of learning iterations to generate a reconstructed version of a first digital image utilizing an image-generating-neural network. Furthermore, in one or more embodiments, the act 1002 includes projecting a first digital image into a learned-initialization-latent vector by iteratively modifying a latent vector (or randomly initialized latent vector) into the learned-initialization-latent vector.

As shown in FIG. 10, the series of acts 1000 include an act 1004 of receiving a request to modify a target (second) digital image. In some instances, the act 1004 includes receiving a request to modify a second digital image by combining the second digital image with a third digital image. As further shown in FIG. 10, the series of acts 1000 include an act 1006 of modifying a target digital image utilizing a learned-initialization-latent vector. Indeed, in some embodiments, the act 1006 includes modify a second digital image by modifying a learned-initialization-latent vector to generate a modified version of the learned-initialization-latent vector and generating a modified version of the second digital image utilizing a image-generating-neural network based on the modified version of the learned-initialization-latent vector.

In some cases, the act 1006 includes generating a learned-latent vector by modifying a learned-initialization-latent vector into a particular modified version of the learned-initialization-latent vector that an image-generating-neural network converts into a reconstructed version of a (target) second digital image. In addition, in one or more embodiments, the act 1006 includes generating, for a second digital image, a learned-latent vector by iteratively modifying a learned-initialization-latent vector for a second number of learning iterations to generate a reconstructed version of the second digital image utilizing an image-generating-neural network. For example, the act 1006 includes generating a learned-latent vector by iteratively modifying a learned-initialization-latent vector for a lesser number of learning iterations to generate a reconstructed version of a second digital image utilizing a image-generating-neural network (in comparison to a number of learning iterations to modify a latent vector into the learned-initialization-latent vector).

In some instances, the act 1006 includes generating a learned-latent vector by iteratively modifying a learned-initialization-latent vector and generating, until satisfying a stopping condition, reconstructed digital images utilizing an image-generating-neural network based on modified versions of the learned-initialization-latent vector. In some embodiments, the act 1006 includes generating reconstructed digital images until satisfying a stopping condition by generating, from particular modified version of a learned-initialization-latent vector utilizing an image-generating-neural network, the reconstructed version of a second digital image that results in a threshold-satisfying loss based on a comparison between the reconstructed version of the second digital image and the second digital image. Furthermore, in one or more embodiments, the act 1006 includes generating reconstructed digital images until satisfying a stopping condition by iteratively modifying a learned-initialization-latent vector for a threshold number of learning iterations. In certain instances, the act 1006 includes generating reconstructed digital images until satisfying a stopping condition by iteratively modifying a learned-initialization-latent vector for a threshold period of time.

In some embodiments, the act 1006 includes generating, for a second digital image, a learned-latent vector that, when processed by an image-generating-neural network, converts into a reconstructed version of the second digital image by iteratively modifying the learned-initialization-latent vector to generate modified versions of the learned-initialization-latent vector and generating reconstructed digital images utilizing the image-generating-neural network based on the modified versions of the learned-initialization-latent vector until reconstructing a version of the second digital image. Furthermore, in some embodiments, the act 1006 includes determining at least one loss from a comparison between a particular reconstructed version of a second digital image and the second digital image and modifying the learned-initialization-latent vector based on the at least one determined loss. Additionally, in some instances, the act 1006 includes generating a learned-latent vector utilizing a same learning rate across different learning iterations while iteratively modifying a learned-initialization-latent vector.

In certain instances, the act 1006 includes generating a modified version of a second digital image utilizing an image-generating-neural network based on a modified version of a learned-initialization-latent vector. Moreover, in one or more embodiments, the act 1006 includes generating a modified version of a second digital image utilizing an image-generating-neural network based on a learned-latent vector. For instance, the act 1006 includes generating a modified version of a second digital image by modifying at least one latent feature vector or at least one random noise map from a learned-latent vector to generate a modified version of the learned-latent vector and generating the modified version of the second digital image utilizing a image-generating-neural network based on the modified version of the learned-latent vector. In some instances, the act 1006 includes generating a modified version of a learned-latent vector by combining the learned-latent vector with an additional learned-latent vector corresponding to a third digital image and generating a modified version of the second digital image utilizing a image-generating-neural network based on the modified version of the learned-latent vector.

In addition (or in alternative) to the acts above, the image projection system 106 can also perform a step for modifying a learned-initialization-latent vector to generate a reconstructed version of a second digital image utilizing a modified version of the learned-initialization-latent vector and an image-generating-neural network. For instance, the acts and algorithms described above in relation to FIG. 4A (e.g., the acts 402-412) comprise the corresponding acts and algorithms for performing a step for modifying a learned-initialization-latent vector to generate a reconstructed version of a second digital image utilizing a modified version of the learned-initialization-latent vector and an image-generating-neural network.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 11:
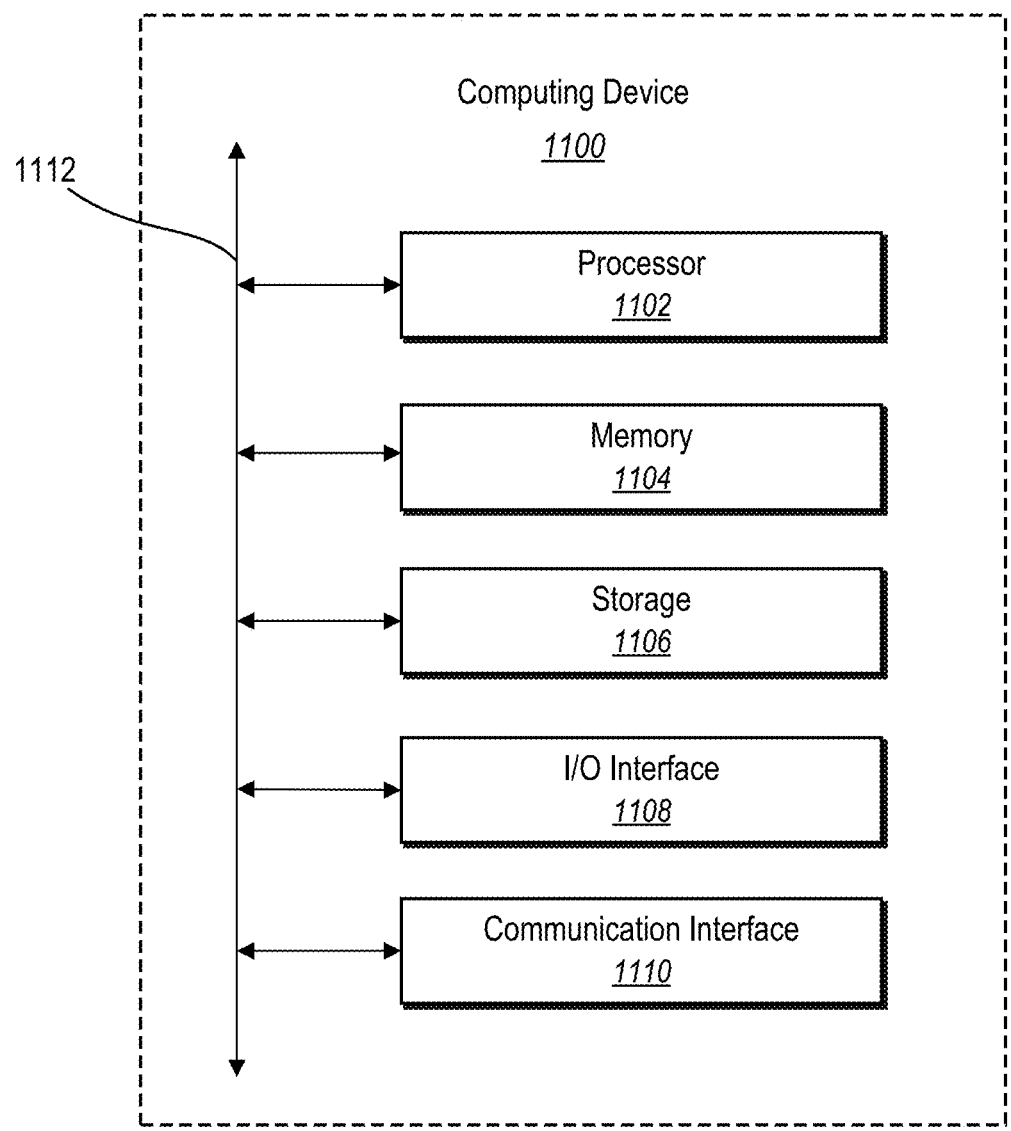
FIG. 11 illustrates a block diagram of an example computing device in accordance with one or more embodiments.

FIG. 11 illustrates a block diagram of an example computing device 1100 that may be configured to perform one or more of the processes described above. One will appreciate that one or more computing devices, such as the computing device 1100 may represent the computing devices described above (e.g., computing device 900, server device(s) 102, and client device 110). In one or more embodiments, the computing device 1100 may be a mobile device (e.g., a mobile telephone, a smartphone, a PDA, a tablet, a laptop, a camera, a tracker, a watch, a wearable device, etc.). In some embodiments, the computing device 1100 may be a non-mobile device (e.g., a desktop computer or another type of client device). Further, the computing device 1100 may be a server device that includes cloud-based processing and storage capabilities.

As shown in FIG. 11, the computing device 1100 can include one or more processor(s) 1102, memory 1104, a storage device 1106, input/output interfaces 1108 (or "I/O interfaces 1108"), and a communication interface 1110, which may be communicatively coupled by way of a communication infrastructure (e.g., bus 1112). While the computing device 1100 is shown in FIG. 11, the components illustrated in FIG. 11 are not intended to be limiting. Additional or alternative components may be used in other embodiments. Furthermore, in certain embodiments, the computing device 1100 includes fewer components than those shown in FIG. 11. Components of the computing device 1100 shown in FIG. 11 will now be described in additional detail.

In particular embodiments, the processor(s) 1102 includes hardware for executing instructions, such as those making up a computer program. As an example, and not by way of limitation, to execute instructions, the processor(s) 1102 may retrieve (or fetch) the instructions from an internal register, an internal cache, memory 1104, or a storage device 1106 and decode and execute them.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1104 may be internal or distributed memory.

The computing device 1100 includes a storage device 1106 includes storage for storing data or instructions. As an example, and not by way of limitation, the storage device 1106 can include a non-transitory storage medium described above. The storage device 1106 may include a hard disk drive ("HDD"), flash memory, a Universal Serial Bus ("U.S.B") drive or a combination these or other storage devices.

As shown, the computing device 1100 includes one or more I/O interfaces 1108, which are provided to allow a user to provide input to (such as user strokes), receive output from, and otherwise transfer data to and from the computing device 1100. These I/O interfaces 1108 may include a mouse, keypad or a keyboard, a touch screen, camera, optical scanner, network interface, modem, other known I/O devices or a combination of such I/O interfaces 1108. The touch screen may be activated with a stylus or a finger.

The I/O interfaces 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1108 are configured to provide graphical data to a display for presentation to a user. The graphical data may be representative of one or more graphical user interfaces and/or any other graphical content as may serve a particular implementation.

The computing device 1100 can further include a communication interface 1110. The communication interface 1110 can include hardware, software, or both. The communication interface 1110 provides one or more interfaces for communication (such as, for example, packet-based communication) between the computing device and one or more other computing devices or one or more networks. As an example, and not by way of limitation, communication interface 1110 may include a network interface controller ("NIC") or network adapter for communicating with an Ethernet or other wire-based network or a wireless NIC ("WNIC") or wireless adapter for communicating with a wireless network, such as a WI-FI. The computing device 1100 can further include a bus 1112. The bus 1112 can include hardware, software, or both that connects components of computing device 1100 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium storing instructions that, when executed by at least one processor, cause a computing device to:
    identify a learned-initialization-latent vector learned from a first digital image utilizing an image-generating-neural network;
    receive a modification request to modify a second digital image; and
    modify the second digital image by:
        modifying the learned-initialization-latent vector to generate a modified version of the learned-initialization-latent vector that, when processed by the image-generating-neural network, converts into a reconstructed version of the second digital image; and
        generating a modified version of the second digital image utilizing the image-generating-neural network with the modified version of the learned-initialization-latent vector and the modification request.

2. The non-transitory computer-readable medium of claim 1, further comprising instructions that, when executed by the at least one processor, cause the computing device to identify at least one latent feature vector and multiple noise maps as part of the learned-initialization-latent vector.

3. The non-transitory computer-readable medium of claim 1, wherein the image-generating-neural network comprises a generative-adversarial-neural network (GAN).

4. The non-transitory computer-readable medium of claim 1, further comprising instructions that, when executed by the at least one processor, cause the computing device to identify the learned-initialization-latent vector by identifying a latent vector that, when processed by the image-generating-neural network, converts into a reconstructed version of the first digital image.

5. The non-transitory computer-readable medium of claim 1, further comprising instructions that, when executed by the at least one processor, cause the computing device to generate a learned-latent vector by modifying the learned-initialization-latent vector into a particular modified version of the learned-initialization-latent vector that the image-generating-neural network converts into the reconstructed version of the second digital image instead of a reconstructed version of the first digital image.

6. The non-transitory computer-readable medium of claim 5, further comprising instructions that, when executed by the at least one processor, cause the computing device to:
    identify the learned-initialization-latent vector by iteratively modifying a latent vector for a first number of learning iterations to generate the reconstructed version of the first digital image utilizing the image-generating-neural network; and
    generate, for the second digital image, the learned-latent vector by iteratively modifying the learned-initialization-latent vector for a second number of learning iterations to generate the reconstructed version of the second digital image utilizing the image-generating-neural network.

7. The non-transitory computer-readable medium of claim 5, further comprising instructions that, when executed by the at least one processor, cause the computing device to generate the learned-latent vector by:

iteratively modifying the learned-initialization-latent vector; and
generating, until satisfying a stopping condition, reconstructed digital images utilizing the image-generating-neural network based on modified versions of the learned-initialization-latent vector by:
generating, from the particular modified version of the learned-initialization-latent vector utilizing the image-generating-neural network, the reconstructed version of the second digital image that results in a threshold-satisfying loss based on a comparison between the reconstructed version of the second digital image and the second digital image;
iteratively modifying the learned-initialization-latent vector for a threshold number of learning iterations; or
iteratively modifying the learned-initialization-latent vector for a threshold period of time.

8. The non-transitory computer-readable medium of claim 7, wherein the first digital image comprises an initialization digital image different from the second digital image.

9. A system comprising:
one or more memory devices comprising an image-generating-neural network and a first digital image; and
one or more processors configured to cause the system to:
identify a learned-initialization-latent vector learned from the first digital image utilizing the image-generating-neural network;
receive a modification request to modify a second digital image;
generate, for the second digital image, a learned-latent vector that, when processed by the image-generating-neural network, converts into a reconstructed version of the second digital image by:
iteratively modifying the learned-initialization-latent vector to generate modified versions of the learned-initialization-latent vector; and
generating reconstructed digital images utilizing the image-generating-neural network based on the modified versions of the learned-initialization-latent vector until reconstructing a version of the second digital image in place of the first digital image; and
generate a modified version of the second digital image utilizing the image-generating-neural network with the learned-latent vector and the modification request.

10. The system of claim 9, wherein the one or more processors are configured to cause the system to identify a concatenation of at least one latent feature vector and multiple random noise maps as part of the learned-initialization-latent vector.

11. The system of claim 9, wherein the image-generating-neural network comprises a generative-adversarial-neural network (GAN).

12. The system of claim 9, wherein the one or more processors are configured to cause the system to project the first digital image into the learned-initialization-latent vector by iteratively modifying a latent vector into the learned-initialization-latent vector.

13. The system of claim 12, wherein the one or more processors are configured to cause the system to:
iteratively modify the latent vector for a number of learning iterations to generate the reconstructed version of the first digital image utilizing the image-generating-neural network; and
generate the learned-latent vector by iteratively modifying the learned-initialization-latent vector for a lesser number of learning iterations to generate the reconstructed version of the second digital image utilizing the image-generating-neural network.

14. The system of claim 9, wherein the one or more processors are configured to cause the system to:
determine at least one loss from a comparison between a particular reconstructed version of the second digital image and the second digital image; and
modify the learned-initialization-latent vector based on the at least one determined loss.

15. The system of claim 9, wherein the one or more processors are configured to cause the system to iteratively modify the learned-initialization-latent vector for a threshold number of learning iterations.

16. The system of claim 9, wherein the one or more processors are configured to cause the system to:
receive a request to modify the second digital image by combining the second digital image with a third digital image;
generate a modified version of the learned-latent vector by combining the learned-latent vector with an additional learned-latent vector corresponding to the third digital image; and
generate a modified version of the second digital image utilizing the image-generating-neural network based on the modified version of the learned-latent vector.

17. The system of claim 9, wherein the one or more processors are configured to cause the system to generate the learned-latent vector utilizing a same learning rate across different learning iterations while iteratively modifying the learned-initialization-latent vector.

18. The system of claim 9, wherein the one or more processors are configured to cause the system to generate the modified version of the second digital image by:
modifying at least one latent feature vector or at least one random noise map from the learned-latent vector to generate a modified version of the learned-latent vector; and
generating the modified version of the second digital image utilizing the image-generating-neural network based on the modified version of the learned-latent vector.

19. A computer-implemented method comprising:
identifying a learned-initialization-latent vector learned from a first digital image utilizing an image-generating-neural network;
receiving a request to modify a second digital image;
performing a step for modifying the learned-initialization-latent vector to generate a reconstructed version of the second digital image utilizing a modified version of the learned-initialization-latent vector and the image-generating-neural network; and
generating a modified version of the second digital image utilizing the image-generating-neural network based on the modified version of the learned-initialization-latent vector.

20. The computer-implemented method of claim 19, further comprising projecting the first digital image into the learned-initialization-latent vector by iteratively modifying a randomly initialized latent vector into the learned-initialization-latent vector.

* * * * *